United States Patent
Wang

(10) Patent No.: US 12,459,986 B2
(45) Date of Patent: Nov. 4, 2025

(54) SYSTEM AND METHOD FOR CHARACTERIZING DRUG PRODUCT IMPURITIES

(71) Applicant: Regeneron Pharmaceuticals, Inc., Tarrytown, NY (US)

(72) Inventor: Shunhai Wang, Ossining, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 928 days.

(21) Appl. No.: 17/677,499

(22) Filed: Feb. 22, 2022

(65) Prior Publication Data

US 2022/0169704 A1  Jun. 2, 2022

Related U.S. Application Data

(62) Division of application No. 16/223,463, filed on Dec. 18, 2018, now abandoned.

(60) Provisional application No. 62/743,632, filed on Oct. 10, 2018, provisional application No. 62/610,029, filed on Dec. 22, 2017.

(51) Int. Cl.
| | |
|---|---|
| *C07K 16/00* | (2006.01) |
| *B01D 15/30* | (2006.01) |
| *C07K 16/06* | (2006.01) |
| *C12Q 1/6872* | (2018.01) |
| *G01N 30/02* | (2006.01) |
| *G01N 30/88* | (2006.01) |
| *G01N 33/15* | (2006.01) |
| *G01N 33/68* | (2006.01) |

(52) U.S. Cl.
CPC ............ *C07K 16/00* (2013.01); *B01D 15/305* (2013.01); *C07K 16/065* (2013.01); *G01N 33/15* (2013.01); *G01N 33/6857* (2013.01); *C07K 2317/14* (2013.01); *C07K 2317/41* (2013.01); *C07K 2317/50* (2013.01); *C07K 2317/515* (2013.01); *C07K 2317/55* (2013.01); *C07K 2319/00* (2013.01); *C12Q 1/6872* (2013.01); *C12Y 305/01052* (2013.01); *G01N 2030/027* (2013.01); *G01N 2030/8831* (2013.01); *G01N 33/6848* (2013.01)

(58) Field of Classification Search
None
See application file for complete search history.

(56) References Cited

U.S. PATENT DOCUMENTS

| | | | |
|---|---|---|---|
| 9,550,826 B2 * | 1/2017 | Labkovsky | C07K 16/241 |
| 2004/0092719 A1 | 5/2004 | Birck-Wilson et al. | |
| 2007/0072307 A1 | 3/2007 | Godavarti et al. | |
| 2014/0308273 A1 | 10/2014 | Carvalhal et al. | |
| 2015/0204824 A1 | 7/2015 | Lauber et al. | |
| 2015/0316515 A1 | 11/2015 | Lauber et al. | |
| 2016/0090399 A1 | 3/2016 | Kozlov et al. | |
| 2016/0251441 A1 | 9/2016 | O'Connor et al. | |
| 2019/0194298 A1 | 6/2019 | Wang | |
| 2019/0234959 A1 | 8/2019 | Wang | |

FOREIGN PATENT DOCUMENTS

| | | |
|---|---|---|
| AR | 114045 A1 | 7/2020 |
| AU | 2018392334 A1 | 5/2020 |
| CA | 3084059 A1 | 6/2019 |
| CN | 1681837 A | 10/2005 |
| CN | 1759186 A | 4/2006 |
| CN | 111479618 A | 7/2020 |
| JP | 2016-538267 A | 12/2016 |
| TW | 201938581 A | 10/2019 |
| WO | 2004/092393 A1 | 10/2004 |
| WO | 2011/131746 A2 | 10/2011 |
| WO | 2015/061526 A1 | 4/2015 |
| WO | 2019/126123 A1 | 6/2019 |

OTHER PUBLICATIONS

Boersema et al. (Hydrophilic interaction liquid chromatography (HILIC) in proteomics, Anal Bioanal Chem (2008) 391:151-159) ( Year: 2008).*
Periat et al., Potential of hydrophilic interaction chromatography for the analytical characterization of protein biopharmaceuticals. J Chromatogr A. May 27, 2016;1448:81-92.
U.S. Appl. No. 16/223,463, filed Dec. 18, 2018, 2019/0194298.
Ares et al., Hydrophilic interaction chromatography in drug analysis. Cent Eur J Chem. 2012;10(3):534-553.

(Continued)

*Primary Examiner* — Manjunath N Rao
*Assistant Examiner* — Jae W Lee
(74) *Attorney, Agent, or Firm* — McCarter & English, LLP

(57) ABSTRACT

Systems and methods for characterizing low molecular weight (LMW) protein drug product impurities are provided. One embodiment uses hydrophilic interaction chromatography (HILIC) coupled to mass spectrometry analysis. After removal of the N-linked glycans from the protein drug product, for example an antibody drug product, the elution of LMW impurities from the HILIC column was determined by the size of the molecular weight species. In some embodiments, the HILIC separation is performed under denaturing conditions, making the detection of LMW forms using this method highly comparable to both SDS-PAGE and CE-SDS methods. LMW drug product impurities include, but are not limited to light chain, half antibody, H2L, H2, HL, HC, peptide backbone-truncated species, and combinations thereof.

8 Claims, 12 Drawing Sheets

(56) References Cited

OTHER PUBLICATIONS

Clincke et al., Characterization of metalloprotease and serine protease activities in batch CHO cell cultures: control of human recombinant IFN-upsilon proteolysis by addition of iron citrate. BMC Proc. 2011;5(Suppl. 8):p. 115, 3 pages.

Cohen et al., Beta-elimination and peptide bond hydrolysis: two distinct mechanisms of human IgG1 hinge fragmentation upon storage. J Am Chem Soc. Jun. 6, 2007;129(22):6976-7.

Cordoba et al., Non-enzymatic hinge region fragmentation of antibodies in solution. J Chromatogr B Analyt Technol Biomed Life Sci. Apr. 25, 2005;818(2):115-21.

D'Atri et al., Hydrophilic Interaction Chromatography for the Characterization of Therapeutic Monoclonal Antibodies at Protein, Peptide, and Glycan Levels. LCGC Europe. Aug. 1, 2017;30(8):424-434.

D'Atri et al., Hydrophilic Interaction Chromatography Hyphenated with Mass Spectrometry: A Powerful Analytical Tool for the Comparison of Originator and Biosimilar Therapeutic Monoclonal Antibodies at the Middle-up Level of Analysis. Anal Chem. Feb. 7, 2017;89(3):2086-2092.

Dick et al., C-terminal lysine variants in fully human monoclonal antibodies: investigation of test methods and possible causes. Biotechnol Bioeng. Aug. 15, 2008;100(6):1132-43.

Dominguez-Vega et al., High-resolution glycoform profiling of intact therapeutic proteins by hydrophilic interaction chromatography-mass spectrometry. Talanta. Jul. 1, 2018;184:375-381.

Gargano et al., Capillary HILIC-MS: A New Tool for Sensitive Top-Down Proteomics. Anal Chem. Jun. 5, 2018;90 (11):6601-6609.

Gillece-Castro et al., N-Linked Glycans of Glycoproteins: A New Column for Improved Resolution. Waters, www.waters.com. 7 pages, (2009).

Haberger et al., Rapid characterization of biotherapeutic proteins by size-exclusion chromatography coupled to native mass spectrometry. MAbs. 2016;8(2):331-9.

Hu et al., Carboxypeptidase D is the only enzyme responsible for antibody C-terminal lysine cleavage in Chinese hamster ovary (CHO) cells. Biotechnol Bioeng. Oct. 2016;113(10):2100-6.

Hunt et al., Capillary isoelectric focusing and sodium dodecyl sulfate-capillary gel electrophoresis of recombinant humanized monoclonal antibody HER2. J Chromatogr A. Sep. 13, 1996;744(1-2):295-301.

Kaltashov et al., Conformation and dynamics of biopharmaceuticals: transition of mass spectrometry-based tools from academe to industry. J Am Soc Mass Spectrom. Mar. 2010;21(3):323-37.

Lacher et al., Development, validation, and implementation of capillary gel electrophoresis as a replacement for SDS-PAGE for purity analysis of IgG2 mAbs. J Sep Sci. Feb. 2010;33(2):218-27.

Lawrence, Billion dollar babies—biotech drugs as blockbusters. Nat Biotechnol. Apr. 2007;25(4):380-2.

Le et al., Trap for MAbs: Characterization of intact monoclonal antibodies using reversed-phase HPLC on-line with ion-trap mass spectrometry. Journal of the American Society for Mass Spectrometry. Mar. 2005;16(3):307-311.

Liu et al., Analysis of reduced monoclonal antibodies using size exclusion chromatography coupled with mass spectrometry. J Am Soc Mass Spectrom. Dec. 2009;20(12):2258-64.

Liu et al., Characterization of lower molecular weight artifact bands of recombinant monoclonal IgG1 antibodies on hon-reducing SDS-PAGE. Biotechnol Lett. Nov. 2007;29(11):1611-22.

Liu et al., Ranking the susceptibility of disulfide bonds in human IgG1 antibodies by reduction, differential alkylation, and LC-MS analysis. Anal Chem. Jun. 15, 2010;82(12):5219-26.

Michels et al., Quantitative impurity analysis of monoclonal antibody size heterogeneity by CE-LIF: example of development and validation through a quality-by-design framework. Electrophoresis. Mar. 2012;33(5):815-26.

Moussa et al., Immunogenicity of Therapeutic Protein Aggregates. J Pharm Sci. Feb. 2016;105(2):417-430.

Rosenberg, Effects of protein aggregates: an immunologic perspective. AAPS J. Aug. 4, 2006;8(3):E501-7.

Rustandi et al., Applications of CE SDS gel in development of biopharmaceutical antibody-based products. Electrophoresis. Sep. 2008;29(17):3612-20.

Vandenheede et al., Hydrophilic Interaction Chromatography for the Characterization of Therpeutic Monoclonal Antibodies at Protein Peptide, and Glycan Levels. LCGC Europe. Aug. 1, 2017;30(8):424-434.

Vlasak et al., Fragmentation of monoclonal antibodies. MAbs. May-Jun. 2011;3(3):253-63.

Walsh, Biopharmaceutical benchmarks 2014. Nat Biotechnol. Oct. 2014;32(10):992-1000.

Wang et al., Characterization of drug-product-related impurities and variants of a therapeutic monoclonal antibody by higher energy C-trap dissociation mass spectrometry. Anal Chem. Jan. 20, 2015;87(2):914-21.

Woods et al., LC-MS characterization and purity assessment of a prototype bispecific antibody. MAbs. Sep.-Oct. 2013;5(5):711-22.

Zhang et al., Mass spectrometry for the biophysical characterization of therapeutic monoclonal antibodies. FEBS Lett. Jan. 21, 2014;588(2):308-17.

Zhu et al., Investigation of monoclonal antibody fragmentation artifacts in non-reducing SDS-PAGE. J Pharm Biomed Anal. Sep. 2013;83:89-95.

International Search Report and Written Opinion for Application No. PCT/US2018/066160, dated May 22, 2019, 20 pages.

Li et al., Cell culture processes for monoclonal antibody production. MAbs. Sep.-Oct. 2010;2(5):466-79.

Smith et al., Using hydrophilic interaction chromatography for heightened product characterization to overcome challenges with hydrophobic monoclonal antibodies and antibody drug conjugates. Waters Corporation. Apr. 2016;8 pages.

Torkashvand et al., Main Quality Attributes of Monoclonal Antibodies and Effect of Cell Culture Components. Iran Biomed J. May 2017;21(3):131-41.

Abdollahpour-Alitappeh et al., Evaluation of Factors Influencing Antibody Reduction for Development of Antibody Drug Conjugates. Iran Biomed J. Jul. 2017;21(4):270-4.

Bobaly et al., Protocols for the analytical characterization of therapeutic monoclonal antibodies. II—Enzymatic and chemical sample preparation. J Chromatogr B Analyt Technol Biomed Life Sci. Aug. 15, 2017;1060:325-335.

Higel et al., Small scale affinity purification and high sensitivity reversed phase nanoLC-MS N-glycan characterization of mAbs and fusion proteins. mAbs. Aug. 2014;6(4):894-903.

\* cited by examiner

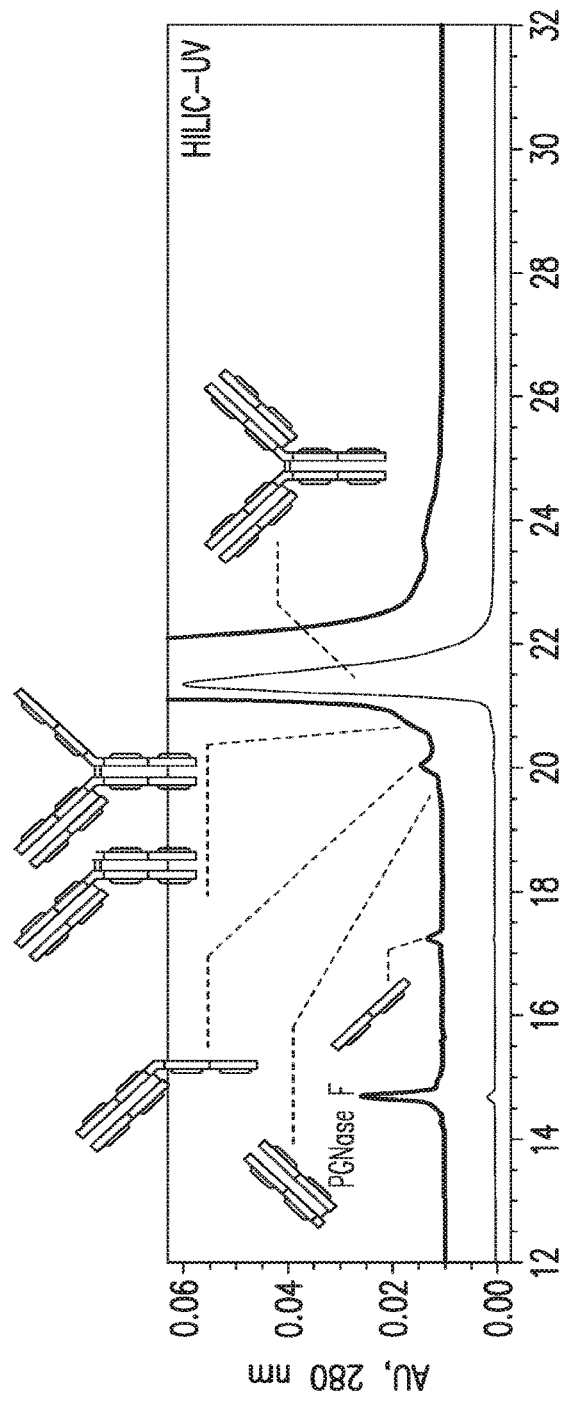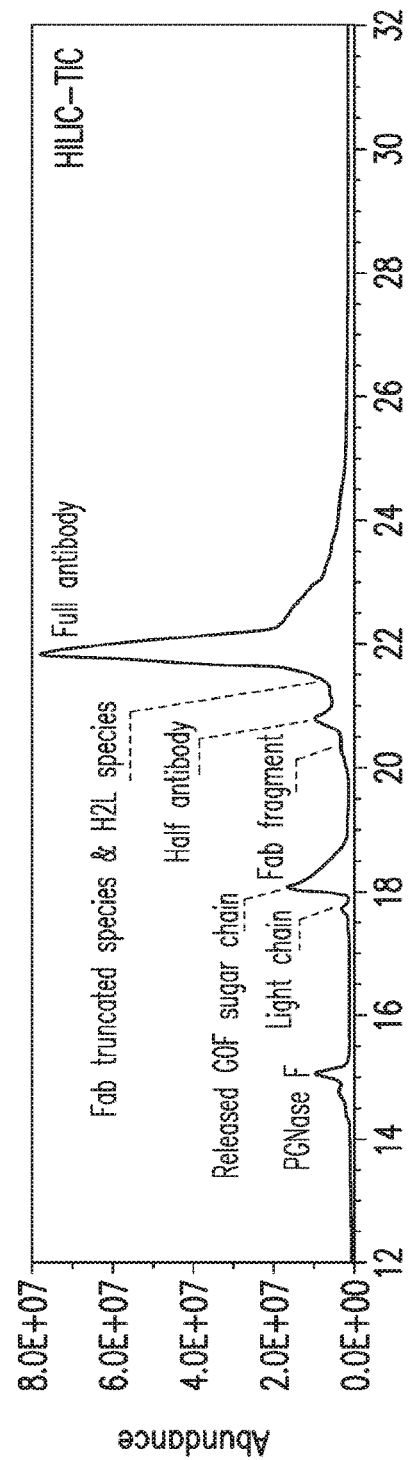

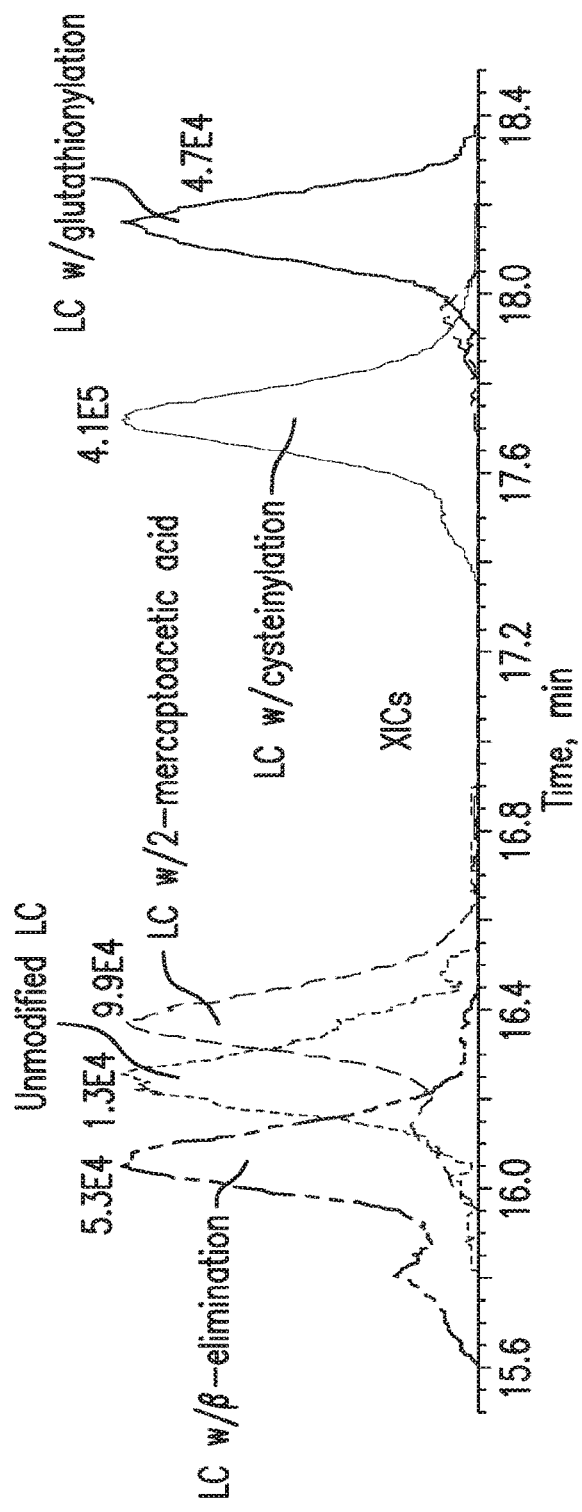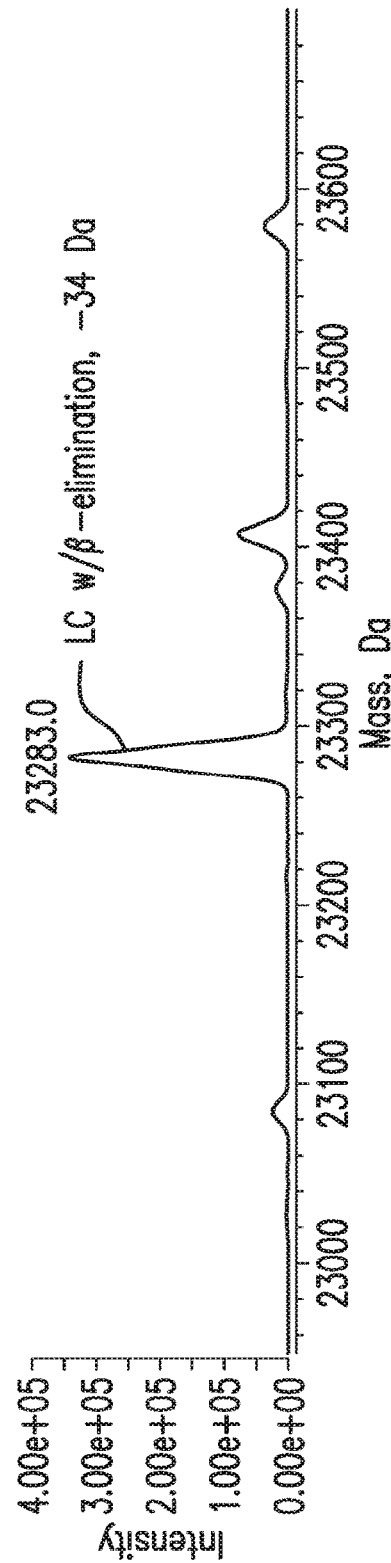
FIG. 2A
FIG. 2B

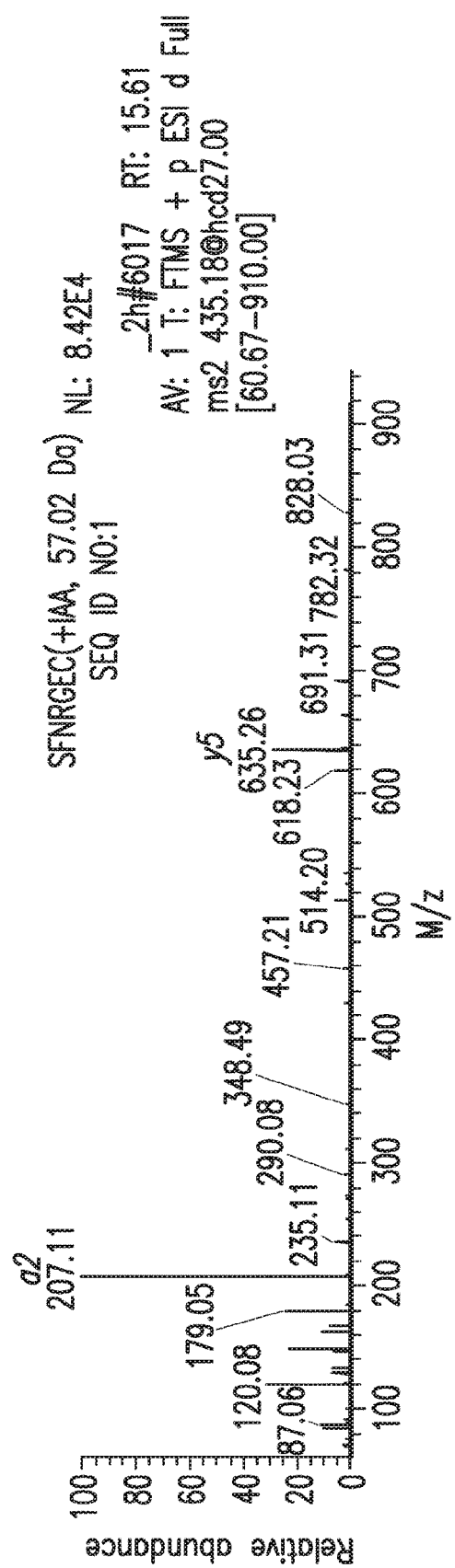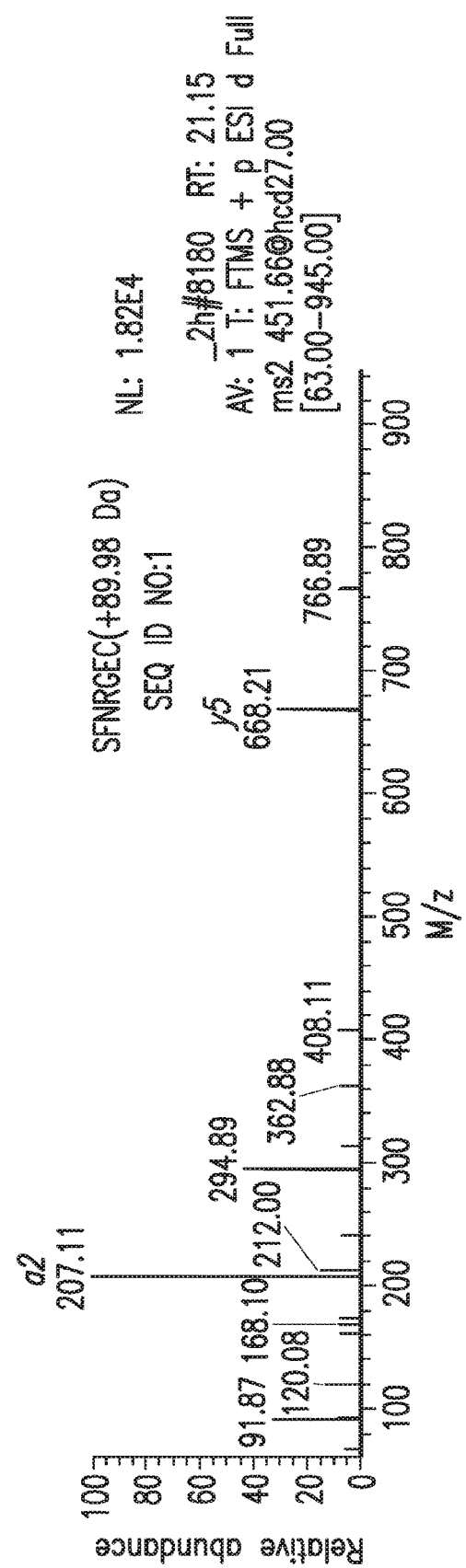
FIG. 6A
FIG. 6B

SYSTEM AND METHOD FOR CHARACTERIZING DRUG PRODUCT IMPURITIES

CROSS REFERENCE TO RELATED APPLICATIONS

This application is a Divisional of U.S. patent application Ser. No. 16/223,463 filed on Dec. 18, 2018, which claims benefit of and priority to U.S. Provisional Patent Application No. 62/743,632 filed on Oct. 10, 2018, and U.S. Provisional Patent Application No. 62/610,029 filed on Dec. 22, 2017. The entire contents of these applications are incorporated by reference in their entirety.

FIELD OF THE INVENTION

The invention is generally directed to protein separation methods and cell culture methods.

BACKGROUND OF THE INVENTION

Monoclonal antibodies (mAbs) have been successfully employed to target a wide range of therapeutic areas over the last two decades (Walsh G., *Nature biotechnology*, 32:992-1000 (2014); Lawrence S. *Nature biotechnology*, 25:380-2 (2007)). While mAbs possess a conserved covalent heterotetrameric structure consisting of two disulfide-linked heavy chains, each covalently linked through a disulfide bond to a light chain, these proteins often contain low levels of product-related impurities even after extensive purification steps. Low molecular weight (LMW) species (e.g. peptide backbone-truncated fragments) and high molecular weight (HMW) species (e.g. antibody dimer species) are both examples of product-related impurities that contribute to the size heterogeneity of mAb products. The formation of HMW species within a therapeutic mAb drug product as a result of protein aggregation can potentially compromise both drug efficacy and safety (e.g. eliciting unwanted immunogenic response)(Rosenberg A S. *The AAPS journal*, 8:E501-7 (2006); Moussa E M, et al. *Journal of pharmaceutical sciences*, 105:417-30(2006)). LMW species of any therapeutic protein may result from host cell protease activity during production. LMW species often have low or substantially reduced activity relative to the monomeric form of the antibody, while exposing novel epitopes that can lead to immunogenicity or potentially impact pharmacokinetic properties in vivo (Vlasak J, Ionescu R. *mAbs*, 3:253-63 (2011)). As a result, both HMW and LMW species are considered critical quality attributes that are routinely monitored during drug development and as part of release testing of purified drug substance during manufacturing.

Molecular weight heterogeneity of mAb products is traditionally characterized by multiple orthogonal analytical methods (Michels D A, Parker M, Salas-Solano O. *Electrophoresis*, 33:815-26(2012)). One of the most commonly used techniques to assess mAb product purity is SDS-PAGE, performed under non-reducing conditions. During analysis, minor bands corresponding to LMW species can be routinely observed and quantified, including H2L (2 heavy chains and 1 light chain), H2 (2 heavy chains), HL (1 heavy chain and 1 light chain), HC (1 heavy chain), and LC (1 light chain) species, with respect to antibodies (Liu H, Gaza-Bulseco G, Chumsae C, Newby-Kew A. *Biotechnology letters*, 29:1611-22(2007)). Proteolytic fragments may also be observed. The proposed identity of each minor band can be supported by N-terminal sequencing via Edman degradation, in-gel tryptic digestion followed by mass spectrometry analysis, and western blot analysis using anti-Fc and anti-light chain antibodies. However, any proposed structures resulting from these methods cannot be unambiguously confirmed at the intact protein level. Furthermore, sample preparation conditions employed in SDS-PAGE experiments can generate LMW artifacts through disulfide bond scrambling, which can lead to overestimations of minor LMW species (Zhu Z C, et al. *Journal of pharmaceutical and biomedical analysis*, 83:89-95(2013)). More recently, capillary electrophoresis-sodium dodecyl sulfate (CE-SDS) has emerged as a modern equivalent of SDS-PAGE, offering superior reproducibility, sensitivity, and throughput (Rustandi R R, Washabaugh M W, Wang Y. *Electrophoresis*, 29:3612-20 (2008); Lacher N A, et al. *Journal of separation science*, 33:218-27 (2010); Hunt G, Moorhouse K G, Chen A B. *Journal of chromatography A*, 744:295-301(1996)). During CE-SDS analysis of mAb products, minor peaks with shorter migration times (LMW forms) than the intact antibody can be routinely observed. Unlike SDS-PAGE analysis, these LMW impurities cannot be extracted or subjected to further analyses. As a result, the identities of LMW impurities observed in CE-SDS methods are often proposed solely based on empirical knowledge. Thus, an orthogonal method to directly separate and unambiguously identify the LMW impurities in mAb products is essential for ensuring control of the manufacturing process during antibody product development.

Accurate mass measurement of intact mAb proteins by modern mass spectrometers has become increasingly popular in the biopharmaceutical industry as one of the most reliable identification techniques (Kaltashov I A, et al., *Journal of the American Society for Mass Spectrometry*, 21:323-37 (2010)); Zhang H, Cui W, Gross M L. *FEBS letters*, 588:308-17(2014)). Specifically, a variety of "hyphenated chromatography-mass spectrometry" methods have demonstrated the capability of detecting low-abundance impurities in mAb products and providing highly detailed analyses that cannot be achieved by either SDS-PAGE or CE-SDS methods (Le J C, Bondarenko P V. *Journal of the American Society for Mass Spectrometry*, 16:307-11 (2005); Haberger M, et al. *mAbs*, 8:331-9 (2016)). For example, reversed-phase chromatography (RPLC) coupled to mass spectrometry can be used to detect free light chain and associated post-translational modifications (e.g. cysteinylation and glutathionylation) present in mAb drug products. However, compared to SDS-PAGE and CE-SDS methods, RPLC often lacks sufficient resolution to separate LMW species and thus fails to elucidate the complete LMW profile. For example, the identification of H2L species in mAb drug products has never been reported by RPLC-based intact mass analysis, owing to its low abundance and poor resolution from the main intact antibody. Another MS-based technique that is promising for characterizing mAb product-related impurities is native electrospray ionization mass spectrometry (Native ESI-MS), which is particularly informative when coupled with size exclusion chromatography (SEC) (Haberger M, et al. *mAbs*, 8:331-9 (2016)). However, the LMW species identified in native SEC-MS analysis are often not the same as those identified by SDS-PAGE or CE-SDS, due to significantly different experimental conditions used between methods. Specifically, the sample preparation required for SDS-PAGE and CE-SDS often starts with protein denaturation, where the non-covalent interactions between the N-terminal regions of HC-LC pairs and the C-terminal regions of the HC-HC pairs are disrupted. As a result, LMW impurities such as H2L, half antibody, and free light chain species are able to dissociate from the mAb molecule if the interchain disulfide bonds are broken. In comparison, native SEC-MS analyzes the mAb samples under near native conditions, permitting the strong non-covalent interchain interactions to be preserved and allowing the four-chain structure of the mAb molecule to be maintained even if the interchain disulfide bonds are broken. Although advances in SEC column chemistry have made it possible to use denaturing buffers (e.g. 30% acetonitrile, 0.1% FA and 0.1% TFA) that are normally used in reversed-phase chromatography for SEC separation and direct coupling to online mass spectrometry analysis (Liu H, Gaza-Bulseco G, Chumsae C. *Journal of the American Society for Mass Spectrometry,* 20:2258-64(2009)), the LC resolution is still sub-optimal to detect many LMW species.

Thus, it is an object of the invention to provide systems and methods for the characterization of LMW protein drug impurities.

It is another object of the invention to provide protein drug products with reduced levels of impurities.

It is still another object of the invention to provide methods of producing protein drug products with reduced protein drug product impurities.

SUMMARY OF THE INVENTION

Systems and methods for characterizing low molecular weight (LMW) protein drug product impurities are provided. One embodiment uses hydrophilic interaction chromatography (HILIC) coupled to mass spectrometry analysis. After removal of the N-linked glycans from the protein drug product, for example an antibody drug product, the elution of LMW impurities from the HILIC column is determined by the size of the molecular weight species. In some embodiments, the HILIC separation is performed under denaturing conditions, making the detection of LMW forms using this method highly comparable to both SDS-PAGE and CE-SDS methods. LMW drug product impurities include, but are not limited to light chain, half antibody, H2L, H2, HL, HC, peptide backbone-truncated species, and combinations thereof.

The disclosed HILIC-MS systems and methods provide detailed LMW identification information. The reliable identification and detailed structural information revealed by HILIC-MS analysis is highly valuable for in-depth characterization of LMW impurities in protein drug products, which is often required for late-stage molecule development. Furthermore, because the disclosed HILIC-MS system and methods use gentler sample preparations than either SDS-PAGE or CE-SDS does, it is less likely to generate LMW artifacts. The HILIC-MS systems and methods can be used as a semi-quantitative analysis to compare the LMW impurity profile between samples or simply applied qualitatively.

One embodiment provides a protein drug product containing a protein drug and an excipient, wherein the protein drug product comprises between about 0.05 and about 30.0% w/w of low molecular weight protein drug impurities. The protein drug product can be an antibody, a fusion protein, recombinant protein, or a combination thereof. In other embodiments, the drug product contains between about 0.05% to about 25%, or about 0.05% to about 15%, or about 0.05% to about 10%, or about 0.05% to about 5%, or about 1 to about 25%, or about 1 to about 15%, about 1 to about 10%, or about 1 to about 5% w/w of low molecular weight protein drug impurities.

Another embodiment provides a method for characterizing low molecular weight protein drug product impurities including the steps of
i) deglycosylating a protein drug product sample,
ii) separating protein components of the protein drug product sample by hydrophilic interaction chromatography, and
iii) analyzing the separated protein components by mass spectroscopy to characterize low molecular weight protein drug product impurities in the protein drug product sample.

The method further provides an optional reducing step. The reducing step may take place in between step i) and step ii). The protein drug product sample can be taken from a fed-batch culture. As noted above, the protein drug product can be an antibody, a fusion protein, recombinant protein, or a combination thereof.

Still another embodiment provides a method of producing an antibody, including the steps of culturing cells producing the antibody in a cell culture, obtaining a sample from the cell culture, characterizing and quantifying low molecular weight impurities in the sample according to the method described above and modifying one or more culture conditions of the cell culture to reduce the amount of characterized low molecular protein drug impurities produced during cell culture of the antibody. In some embodiments, the sample is taken during the cell culture at any interval. In other embodiments, the sample is taken following production culture, following protein harvest or following purification. The one or more conditions of the cell culture that are changed to reduce the amount of low molecular weight protein drug impurities can be selected from the group consisting of temperature, pH, cell density, amino acid concentration, osmolality, growth factor concentration, agitation, gas partial pressure, surfactants, or combinations thereof. The cells can be eukaryotic or prokaryotic. The cells can be Chinese Hamster Ovary (CHO) cells (e.g. CHO K1, DXB-11 CHO, Veggie-CHO), COS cells (e.g. COS-7), retinal cells, Vero cells, CV1 cells, kidney cells (e.g. HEK293, 293 EBNA, MSR 293, MDCK, HaK, BHK21), HeLa cells, HepG2 cells, WI38 cells, MRC 5 cells, Colo25 cells, HB 8065 cells, HL-60 cells, lymphocyte cells, e.g. autologous T cells, Jurkat (T lymphocytes) or Daudi (B lymphocytes), A431 (epidermal) cells, U937 cells, 3T3 cells, L cells, C127 cells, SP2/0 cells, NS-0 cells, MMT cells, stem cells, tumor cells, and a cell line derived from any of the aforementioned cells. In one embodiment the cells are hybridoma or quadroma cells. Still another embodiment provides an antibody produced by the methods described herein.

Yet another embodiment provides a system for characterizing low molecular weight drug impurities. The system includes a hydrophilic interaction liquid chromatography system including a hydrophilic interaction liquid chromatography (HILIC) column linked to mobile phase A and mobile phase B as exemplified herein, and the HILIC column is in fluid communication with a mass spectroscopy system.

In yet another embodiment, the invention relates to use of the method according to the invention for determination of stability and forced degradation studies of a protein drug product.

In a further embodiment, the invention relates to use of a system according to the invention for determination of stability and forced degradation studies of a protein drug product.

BRIEF DESCRIPTION OF THE DRAWINGS

FIGS. 1A and 1B are chromatograms of HILIC separation of mAb-1 drug substance sample. FIG. 1A is the ultraviolet profile and FIG. 1B is the HILIC profile. The UV signal was amplified 10 times in FIG. 1A to better visualize the LMW impurities.

FIG. 2A shows the extracted ion chromatograms (XICs) of different light chain variants using the m/z of the most abundant charge state. FIG. 2B shows the deconvoluted mass spectrum of light chain with β-elimination.

FIG. 6A shows an MS2 spectrum of light chain C-terminal peptides from Lys-C digestion under non-reduced conditions wherein the C-terminal Cys is modified by iodoacetamide. FIG. 6B shows an MS2 spectrum of light chain C-terminal peptides from Lys-C digestion under non-reduced conditions wherein the C-terminal Cys is modified by unknown modification of +89.98 Da.

DETAILED DESCRIPTION OF THE INVENTION

I. Definitions

Figure 2C:
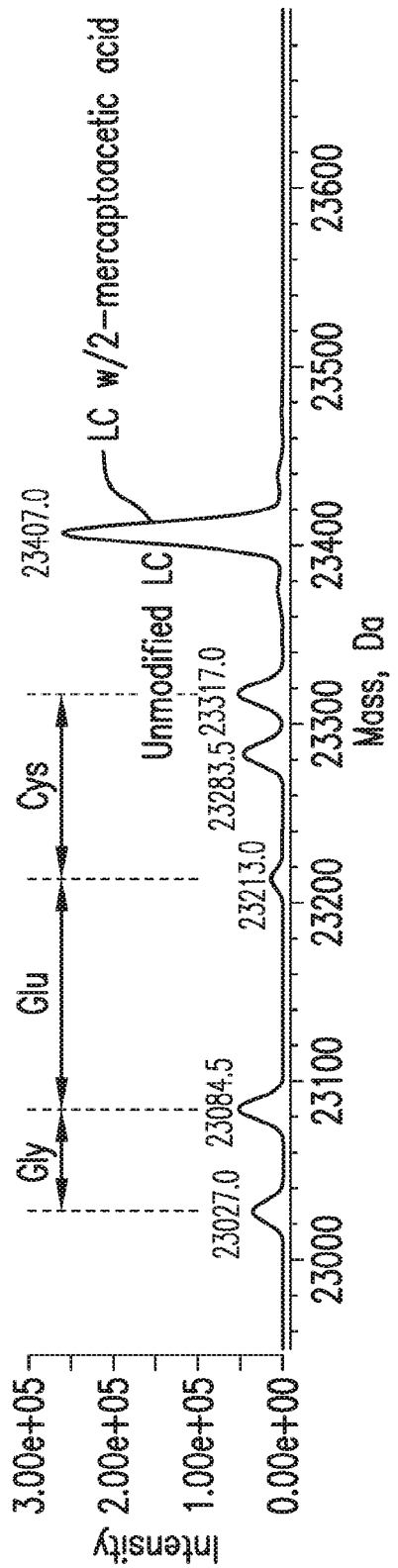
FIG. 2C shows the deconvoluted mass spectrum of light chain modified by 2-mercaptoacetic acid, unmodified light chain and light chain with C-terminal residues clipped.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The term "low molecular weight (LMW) protein drug impurity" includes but is not limited to precursors, degradation products, truncated species, proteolytic fragments including Fab fragments, Fc or heavy chain fragments, ligand or receptor fragments, H2L (2 heavy chains and 1 light chain), H2 (2 heavy chains), HL (1 heavy chain and 1 light chain), HC (1 heavy chain), and LC (1 light chain) species. A LMW protein drug impurity can be any variant which is an incomplete version of the protein product, such as one or more components of a multimeric protein. Protein drug impurity, drug impurity or product impurity are terms that may be used interchangeably throughout the specification and include LMW protein drug impurities. LMW drug or product impurities are generally considered molecular variants with properties such as activity, efficacy, and safety that may be different from those of the desired drug product.

Degradation of protein product is problematic during production of the protein drug product in cell culture systems. For example, proteolysis of a protein product may occur due to release of proteases in cell culture medium. Medium additives, such as soluble iron sources added to inhibit metalloproteases, or serine and cysteine proteases inhibitors, have been implemented in cell culture to prevent degradation (Clincke, M.-F., et al, *BMC Proc.* 2011, 5, P115). C-terminal fragments may be cleaved during production due to carboxyl peptidases in the cell culture (Dick, L W et al, *Biotechnol Bioeng* 2008; 100:1132-43). Subsequently, there is a need to profile and monitor LMW impurities.

"Protein" refers to a molecule comprising two or more amino acid residues joined to each other by a peptide bond. Protein includes polypeptides and peptides and may also include modifications such as glycosylation, lipid attachment, sulfation, gamma-carboxylation of glutamic acid residues, alkylation, hydroxylation and ADP-ribosylation. Proteins can be of scientific or commercial interest, including protein-based drugs, and proteins include, among other things, enzymes, ligands, receptors, antibodies and chimeric or fusion proteins. Proteins are produced by various types of recombinant cells using well-known cell culture methods, and are generally introduced into the cell by genetic engineering techniques (e.g., such as a sequence encoding a chimeric protein, or a codon-optimized sequence, an intronless sequence, etc.) where it may reside as an episome or be intergrated into the genome of the cell.

"Antibody" refers to an immunoglobulin molecule consisting of four polypeptide chains, two heavy (H) chains and two light (L) chains inter-connected by disulfide bonds. Each heavy chain has a heavy chain variable region (HCVR or VH) and a heavy chain constant region. The heavy chain constant region contains three domains, CH1, CH2 and CH3. Each light chain has a light chain variable region and a light chain constant region. The light chain constant region consists of one domain (CL). The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. The term "antibody" includes reference to both glycosylated and non-glycosylated immunoglobulins of any isotype or subclass. The term "antibody" includes antibody molecules prepared, expressed, created or isolated by recombinant means, such as antibodies isolated from a host cell transfected to express the antibody. The term antibody also includes bispecific antibody, which includes a heterotetrameric immunoglobulin that can bind to more than one different epitope. Bispecific antibodies are generally described in US Patent Application Publication No. 2010/0331527, which is incorporated by reference into this application.

"Fc fusion proteins" comprise part or all of two or more proteins, one of which is an Fc portion of an immunoglobulin molecule, which are not otherwise found together in nature. Preparation of fusion proteins comprising certain heterologous polypeptides fused to various portions of antibody-derived polypeptides (including the Fc domain) has been described, e.g., by Ashkenazi et al., Proc. Natl. Acad. ScL USA 88: 10535, 1991; Byrn et al., Nature 344:677, 1990; and Hollenbaugh et al., "Construction of Immunoglobulin Fusion Proteins", in Current Protocols in Immunology, Suppl. 4, pages 10.19.1-10.19.11, 1992. "Receptor Fc fusion proteins" comprise one or more extracellular domain(s) of a receptor coupled to an Fc moiety, which in some embodiments comprises a hinge region followed by a CH2 and CH3 domain of an immunoglobulin. In some embodiments, the Fc-fusion protein comprises two or more distinct receptor chains that bind to a one or more ligand(s). For example, an Fc-fusion protein is a trap, such as for example an IL-1 trap or VEGF trap.

"Cell culture" refers to the propagation or proliferation of cells in a vessel, such as a flask or bioreactor, and includes but is not limited to fed-batch culture, continuous culture, perfusion culture and the like.

The term "HILIC or HILIC chromatography" refers to hydrophilic interaction liquid chromatography or hydrophilic interaction chromatography, and is considered a well-known term of the art.

Proteins of Interest

Any protein of interest suitable for expression in prokaryotic or eukaryotic cells can be used in the engineered host cell systems provided. For example, the protein of interest includes, but is not limited to, an antibody or antigen-binding fragment thereof, a chimeric antibody or antigen-binding fragment thereof, an ScFv or fragment thereof, an Fc-fusion protein or fragment thereof, a growth factor or a fragment thereof, a cytokine or a fragment thereof, or an extracellular domain of a cell surface receptor or a fragment thereof. Proteins of interest may be simple polypeptides consisting of a single subunit, or complex multisubunit proteins comprising two or more subunits. The protein of interest may be a biopharmaceutical product, food additive or preservative, or any protein product subject to purification and quality standards.

In some embodiments, the protein product (protein of interest) is an antibody, a human antibody, a humanized antibody, a chimeric antibody, a monoclonal antibody, a multispecific antibody, a bispecific antibody, an antigen binding antibody fragment, a single chain antibody, a diabody, triabody or tetrabody, a Fab fragment or a F(ab')2 fragment, an IgD antibody, an IgE antibody, an IgM antibody, an IgG antibody, an IgG1 antibody, an IgG2 antibody, an IgG3 antibody, or an IgG4 antibody. In one embodiment, the antibody is an IgG1 antibody. In one embodiment, the antibody is an IgG2 antibody. In one embodiment, the antibody is an IgG4 antibody. In one embodiment, the antibody is a chimeric IgG2/IgG4 antibody. In one embodiment, the antibody is a chimeric IgG2/IgG1 antibody. In one embodiment, the antibody is a chimeric IgG2/IgG1/IgG4 antibody.

In some embodiments, the antibody is selected from the group consisting of an anti-Programmed Cell Death 1 antibody (e.g. an anti-PD1 antibody as described in U.S. Pat. Appln. Pub. No. US2015/0203579A1), an anti-Programmed Cell Death Ligand-1 (e.g. an anti-PD-L1 antibody as described in in U.S. Pat. Appln. Pub. No. US2015/0203580A1), an anti-D114 antibody, an anti-Angiopoetin-2 antibody (e.g. an anti-ANG2 antibody as described in U.S. Pat. No. 9,402,898), an anti-Angiopoetin-Like 3 antibody (e.g. an anti-AngPtl3 antibody as described in U.S. Pat. No. 9,018,356), an anti-platelet derived growth factor receptor antibody (e.g. an anti-PDGFR antibody as described in U.S. Pat. No. 9,265,827), an anti-Erb3 antibody, an anti-Prolactin Receptor antibody (e.g. anti-PRLR antibody as described in U.S. Pat. No. 9,302,015), an anti-Complement 5 antibody (e.g. an anti-05 antibody as described in U.S. Pat. Appln. Pub. No US2015/0313194A1), an anti-TNF antibody, an anti-epidermal growth factor receptor antibody (e.g. an anti-EGFR antibody as described in U.S. Pat. No. 9,132,192 or an anti-EGFRvIII antibody as described in U.S. Pat. Appln. Pub. No. US2015/0259423A1), an anti-Proprotein Convertase Subtilisin Kexin-9 antibody (e.g. an anti-PCSK9 antibody as described in U.S. Pat. No. 8,062,640 or U.S. Pat. Appln. Pub. No. US2014/0044730A1), an anti-Growth And Differentiation Factor-8 antibody (e.g. an anti-GDF8 antibody, also known as anti-myostatin antibody, as described in U.S. Pat. No. 8,871,209 or 9,260,515), an anti-Glucagon Receptor (e.g. anti-GCGR antibody as described in U.S. Pat. Appln. Pub. Nos. US2015/0337045A1 or US2016/0075778A1), an anti-VEGF antibody, an anti-IL1R antibody, an interleukin 4 receptor antibody (e.g. an anti-IL4R antibody as described in U.S. Pat. Appln. Pub. No. US2014/0271681A1 or U.S. Pat. No. 8,735,095 or 8,945,559), an anti-interleukin 6 receptor antibody (e.g. an anti-IL6R antibody as described in U.S. Pat. Nos. 7,582,298, 8,043,617 or 9,173,880), an anti-IL1 antibody, an anti-IL2 antibody, an anti-IL3 antibody, an anti-IL4 antibody, an anti-IL5 antibody, an anti-IL6 antibody, an anti-IL7 antibody, an anti-interleukin 33 (e.g. anti-IL33 antibody as described in U.S. Pat. Appln. Pub. Nos. US2014/0271658A1 or US2014/0271642A1), an anti-Respiratory syncytial virus antibody (e.g. anti-RSV antibody as described in U.S. Pat. Appln. Pub. No. US2014/0271653A1), an anti-Cluster of differentiation 3 (e.g. an anti-CD3 antibody, as described in U.S. Pat. Appln. Pub. Nos. US2014/0088295A1 and US20150266966A1, and in U.S. Application No. 62/222,605), an anti-Cluster of differentiation 20 (e.g. an anti-CD20 antibody as described in U.S. Pat. Appln. Pub. Nos. US2014/0088295A1 and US20150266966A1, and in U.S. Pat. No. 7,879,984), an anti-CD19 antibody, an anti-CD28 antibody, an anti-Cluster of Differentiation-48 (e.g. anti-CD48 antibody as described in U.S. Pat. No. 9,228,014), an anti-Fel d1 antibody (e.g. as described in U.S. Pat. No. 9,079,948), an anti-Middle East Respiratory Syndrome virus (e.g. an anti-MERS antibody as described in U.S. Pat. Appln. Pub. No. US2015/0337029A1), an anti-Ebola virus antibody (e.g. as described in U.S. Pat. Appln. Pub. No. US2016/0215040), an anti-Zika virus antibody, an anti-Lymphocyte Activation Gene 3 antibody (e.g. an anti-LAG3 antibody, or an anti-CD223 antibody), an anti-Nerve Growth Factor antibody (e.g. an anti-NGF antibody as described in U.S. Pat. Appln. Pub. No. US2016/0017029 and U.S. Pat. Nos. 8,309,088 and 9,353,176) and an anti-Activin A antibody. In some embodiments, the bispecific antibody is selected from the group consisting of an anti-CD3×anti-CD20 bispecific antibody (as described in U.S. Pat. Appln. Pub. Nos. US2014/0088295A1 and US20150266966A1), an anti-CD3×anti-Mucin 16 bispecific antibody (e.g., an anti-CD3×anti-Muc16 bispecific antibody), and an anti-CD3×anti-Prostate-specific membrane antigen bispecific antibody (e.g., an anti-CD3×anti-PSMA bispecific antibody). In some embodiments, the protein of interest is selected from the group consisting of abciximab, adalimumab, adalimumab-atto, ado-trastuzumab, alemtuzumab, alirocumab, atezolizumab, avelumab, basiliximab, belimumab, benralizumab, bevacizumab, bezlotoxumab, blinatumomab, brentuximab vedotin, brodalumab, canakinumab, capromab pendetide, certolizumab pegol, cemiplimab, cetuximab, denosumab, dinutuximab, dupilumab, durvalumab, eculizumab, elotuzumab, emicizumab-kxwh, emtansinealirocumab, evinacumab, evolocumab, fasinumab, golimumab, guselkumab, ibritumomab tiuxetan, idarucizumab, infliximab, infliximab-abda, infliximab-dyyb, ipilimumab, ixekizumab, mepolizumab, necitumumab, nesvacumab, nivolumab, obiltoxaximab, obinutuzumab, ocrelizumab, ofatumumab, olaratumab, omalizumab, panitumumab, pembrolizumab, pertuzumab, ramucirumab, ranibizumab, raxibacumab, reslizumab, rinucumab, rituximab, sarilumab, secukinumab, siltuximab, tocilizumab, tocilizumab, trastuzumab, trevogrumab, ustekinumab, and vedolizumab.

In some embodiments, the protein of interest is a recombinant protein that contains an Fc moiety and another domain, (e.g., an Fc-fusion protein). In some embodiments, an Fc-fusion protein is a receptor Fc-fusion protein, which contains one or more extracellular domain(s) of a receptor coupled to an Fc moiety. In some embodiments, the Fc moiety comprises a hinge region followed by a CH2 and CH3 domain of an IgG. In some embodiments, the receptor Fc-fusion protein contains two or more distinct receptor chains that bind to either a single ligand or multiple ligands. For example, an Fc-fusion protein is a TRAP protein, such as for example an IL-1 trap (e.g., rilonacept, which contains the IL-1RAcP ligand binding region fused to the Il-1R1 extracellular region fused to Fc of hIgG1; see U.S. Pat. No. 6,927,004, which is herein incorporated by reference in its entirety), or a VEGF trap (e.g., aflibercept or ziv-aflibercept, which comprises the Ig domain 2 of the VEGF receptor Flt1 fused to the Ig domain 3 of the VEGF receptor Flk1 fused to Fc of hIgG1; see U.S. Pat. Nos. 7,087,411 and 7,279,159). In other embodiments, an Fc-fusion protein is a ScFv-Fc-fusion protein, which contains one or more of one or more antigen-binding domain(s), such as a variable heavy chain fragment and a variable light chain fragment, of an antibody coupled to an Fc moiety.

Cell Culture

In protein production, a "fed-batch cell culture" or "fed-batch culture" refers to a batch culture wherein the cells and culture medium are supplied to the culturing vessel initially, and additional culture nutrients are slowly fed, in discrete increments, to the culture during culturing, with or without periodic cell and/or product harvest before termination of culture. Fed-batch culture includes "semi-continuous fed-batch culture" wherein periodically whole culture (which may include cells and medium) is removed and replaced by fresh medium. Fed-batch culture is distinguished from simple "batch culture" whereas all components for cell culturing (including the animal cells and all culture nutrients) are supplied to the culturing vessel at the start of the culturing process in batch culture. Fed-batch culture may be different from "perfusion culture" insofar as the supernatant is not removed from the culturing vessel during a standard fed-batch process, whereas in perfusion culturing, the cells are restrained in the culture by, e.g., filtration, and the culture medium is continuously or intermittently introduced and removed from the culturing vessel. However, removal of samples for testing purposes during fed-batch cell culture is contemplated. The fed-batch process continues until it is determined that maximum working volume and/or protein production is reached, and protein is subsequently harvested.

The phrase "continuous cell culture" relates to a technique used to grow cells continually, usually in a particular growth phase. For example, if a constant supply of cells is required, or the production of a particular protein of interest is required, the cell culture may require maintenance in a particular phase of growth. Thus, the conditions must be continually monitored and adjusted accordingly in order to maintain the cells in that particular phase.

The terms "cell culture medium" and "culture medium" refer to a nutrient solution used for growing mammalian cells that typically provides the necessary nutrients to enhance growth of the cells, such as a carbohydrate energy source, essential (e.g. phenylalanine, valine, threonine, tryptophan, methionine, leucine, isoleucine, lysine, and histidine) and nonessential (e.g. alanine, asparagine, aspartic acid, cysteine, glutamic acid, glutamine, glycine, proline, serine, and tyrosine) amino acids, trace elements, energy sources, lipids, vitamins, etc. Cell culture medium may contain extracts, e.g. serum or peptones (hydrolysates), which supply raw materials that support cell growth. Media may contain yeast-derived or soy extracts, instead of animal-derived extracts. Chemically defined medium refers to a cell culture medium in which all of the chemical components are known (i.e. have a known chemical structure). Chemically defined medium is entirely free of animal-derived components, such as serum- or animal-derived peptones. In one embodiment, the medium is a chemically defined medium.

The solution may also contain components that enhance growth and/or survival above the minimal rate, including hormones and growth factors. The solution may be formulated to a pH and salt concentration optimal for survival and proliferation of the particular cell being cultured.

A "cell line" refers to a cell or cells that are derived from a particular lineage through serial passaging or subculturing of cells. The term "cells" is used interchangeably with "cell population".

The term "cell" includes any cell that is suitable for expressing a recombinant nucleic acid sequence. Cells include those of prokaryotes and eukaryotes, such as bacterial cells, mammalian cells, human cells, non-human animal cells, avian cells, insect cells, yeast cells, or cell fusions such as, for example, hybridomas or quadromas. In certain embodiments, the cell is a human, monkey, ape, hamster, rat or mouse cell. In other embodiments, the cell is selected from the following cells: Chinese Hamster Ovary (CHO) (e.g. CHO K1, DXB-11 CHO, Veggie-CHO), COS (e.g. COS-7), retinal cell, Vero, CV1, kidney (e.g. HEK293, 293 EBNA, MSR 293, MDCK, HaK, BHK21), HeLa, HepG2, WI38, MRC 5, Colo25, HB 8065, HL-60, lymphocyte, e.g. Jurkat (T lymphocyte) or Daudi (B lymphocyte), A431 (epidermal), U937, 3T3, L cell, C127 cell, SP2/0, NS-0, MMT cell, stem cell, tumor cell, and a cell line derived from an aforementioned cell. In some embodiments, the cell comprises one or more viral genes, e.g. a retinal cell that expresses a viral gene (e.g. a PER.C6® cell). In some embodiments, the cell is a CHO cell. In other embodiments, the cell is a CHO K1 cell.

II. Systems for Characterizing Low Molecular Weight Protein Drug Impurities

Multisubunit therapeutic proteins, particularly monoclonal antibody (mAb)-based therapeutics are inherently heterogeneous with respect to size due to their complex multichain structure and the propensity to accommodate multiple enzymatic and chemical post-translational modifications. Although the levels of size variants within a mAb drug product can be readily quantitated by a variety of biophysical methods, unambiguous identification of those product-related impurities has been particularly challenging.

Hydrophilic interaction chromatography (HILIC) coupled with mass spectrometry analysis was used to identify low levels of lower molecular weight (LMW) impurities present within a purified drug substance lot. After removal of N-linked glycans, the HILIC method separates mAb-related LMW impurities with a size-based elution order. The subsequent mass measurement from a high-resolution accurate mass spectrometer provides direct and unambiguous identification of a variety of low-abundance LMW impurities in a single LC-MS analysis. Free light chain, half antibody, H2L species (antibody possessing a single light chain) and peptide backbone-truncated species can all be confidently identified and elucidated in great detail, including the truncation sites and associated post-translational modifications. Such detailed information that cannot be acquired by traditional purity assays (e.g. SDS-PAGE and CE-SDS) is of great importance to elucidate how the LMW impurities are formed, making this new method a valuable addition to analytical characterization portfolio. This is the first known report where the H2L species was directly detected in a mAb drug substance sample by intact mass analysis without prior enrichment.

A. Systems for Characterizing LMW Impurities

The system includes a hydrophilic interaction liquid chromatography system including a hydrophilic interaction liquid chromatography (HILIC) column linked to mobile phase A and mobile phase B, and the HILIC column is in fluid communication with a mass spectroscopy system. The HILIC column is suitable for use with deglycosylated proteins. In one embodiment, the disclosed system contains a Waters ACQUITY™ UPLC Glycoprotein Amide column (300 Å, 1.7 µm, 2.1×150 mm) with a Waters ACQUITY™ UPLC system. The column is typically operated at 60° C. Exemplary mobile phases include 0.1% TFA in water as mobile phase A, 0.1% TFA in acetonitrile as mobile phase B, and the flow rate was set to 0.2 mL/min. The UV traces are typically recorded at 215 and 280 nm. In one embodiment, the separation is achieved over 55 min with an initial 0.5 min hold at 15% A, followed by an increase to 25% A over the next 0.5 min, and another linear increase to 40% A over the next 40 minutes. The gradient can be ramped to 100% A over 1 min and held for 2 minutes, before dropping to 15% A in 1 min, and then maintained at initial condition for over 10 minutes to equilibrate the column for the next run.

The UPLC is directly coupled to a mass spectrometer, for example a Thermo Scientific Q Exactive hybrid quadrupole Orbitrap mass spectrometer. The capillary voltage is typically set at 4.0 kV, with a sheath gas flow rate of 40 arbitrary units and auxiliary gas flow rate of 15 arbitrary units. The capillary temperature is generally set at 350° C. and the probe heater temperature is generally set at 400° C. Mass spectra are acquired in the mass range of m/z 800-4000. In one embodiment, the raw data is deconvoluted using Intact Mass™ software developed by Protein Metrics.

B. Methods of Characterizing LMW Impurities

The disclosed systems and methods can be used to characterize LMW protein drug impurities. One embodiment provides a method for characterizing low molecular weight protein drug product impurities including the steps of deglycosylating a protein drug product sample, separating protein components of the protein drug product sample by hydrophilic interaction chromatography, and analyzing the separated protein components by mass spectroscopy to characterize low molecular weight protein drug product impurities in the protein drug product sample. In one embodiment the protein drug product sample is taken from or purified from a fed-batch cell culture, a continuous cell culture or a perfusion cell culture. Exemplary protein drug product includes but are not limited to an antibody, a fusion protein, recombinant protein, or a combination thereof. Exemplary low molecular weight protein drug product impurities include but are not limited to precursors, degradation products, truncated species, proteolytic fragments including Fab, ligand or receptor fragments or heavy chain fragments, free light chain, half antibody, H2L, H2, HL, HC, or a combination thereof.

Another embodiment includes a step of reducing the sample. Exemplary reducing agents include but are not limited to dithiothreitol (DTT, CAS 3483-12-3), beta-mercaptoethanol (BME, 2BME, 2-ME, b-mer, CAS 60-24-2), 2-aminoethanethiol (2-MEA-HCl, also called cysteamine-HCl, CAS 156-57-0), Tris (2-carboxyethyl) phosphine hydrochloride, (TCEP, CAS 5961-85-3), cysteine hydrochloride (Cys-HCl, CAS 52-89-1), or 2-mercaptoethanesulfonic acid sodium salt (MESNA). Other methods for reducing protein bonds are known in the art, such as an immobilized reductant column which contains resin to which a thiol-based reducing agent has been immobilized to enable the solid-phase reduction of peptide and protein disulfide bonds. Reducing agents, including oxidizing agents, which are suitable for reducing chemical interaction between polypeptides are also envisioned.

Exemplary elution profiles are discussed above.

C. Methods of Producing High Purity Protein Drug Products

One embodiment provides a method of producing an antibody including the steps of culturing cells producing the antibody, for example in a fed-batch culture, obtaining a sample from the cell culture, characterizing and quantifying low molecular weight impurities in the sample using the systems and methods disclosed herein and modifying one or more culture conditions of the cell culture to reduce the amount of characterized low molecular protein drug impurities produced during cell culture of the antibody. Typically, the conditions are changed to have the protein drug impurities in a range of 0.05% and 30.0%, preferably 0.05% to 15%, 0.05% to 10%, 0.05% to 5%, or 0.05% to 2% (w/w).

The one or more conditions of the cell culture that are changed to reduce the amount of low molecular weight protein drug impurities are selected from the group consisting of temperature, pH, cell density, amino acid concentration, osmolality, growth factor concentration, agitation, gas partial pressure, surfactants, or combinations thereof.

In one embodiment the cells producing the antibody are Chinese hamster ovary cells. In other embodiments, the cells are hybridoma cells.

Another embodiment provides an antibody produced according the methods provided herein have 1 to 5%, 5 to 10%, 10 to 15%, 15 to 20% protein drug impurities.

EXAMPLES

Example 1: HILIC Separation of mAb-1 Drug Substance Sample

Materials

For this study, a recombinant IgG1 mAb (mAb-1) made by Regeneron was used. Peptide-N-Glycosidase F (PNGase F, #P0704L) was purchased from New England Biolabs, 1 M Tris-hydrochloride pH 7.5 solution (#15567-027) was purchased from Invitrogen, dithiothreitol (DTT, #20291) was purchased from Thermo Fisher Scientific, and L-cysteine (#168149-25G) was purchased from Sigma-Aldrich. Acetonitrile (LC-MS grade, #A955-4) and trifluoroacetic acid (TFA, #PI28904) were purchased from Fisher Scientific. Milli-Q water was provided in-house.

Methods

Deglycosylation of mAb-1 and Limited Reduction by DTT and L-Cysteine

The mAb-1 sample was diluted to a final concentration of 5 µg/µL using 100 mM Tri-HCl (pH 7.5). PNGase F was added at an enzyme to substrate ratio of 1 unit/10 µg protein. The deglycosylation reaction was conducted at 37° C. for 3 hours. To initiate the limited reduction by DTT, a 20 µg aliquot of the deglycosylated mAb-1 sample was reduced with 5 mM DTT before immediate injection onto the HILIC column for online UV and mass spectrometry analysis. To initiate the limited reduction by L-cysteine, a 20 µg aliquot of the deglycosylated mAb-1 sample was reduced with 5 mM L-cysteine and then at 37° C. for 30 minutes before injection onto the HILIC column for online UV and mass spectrometry analysis.

HILIC-UV and HILIC-MS Analysis

A Waters ACQUITY UPLC Glycoprotein Amide column (300 Å, 1.7 µm, 2.1×150 mm) was used on a Waters ACQUITY UPLC system for all HILIC separations. The column was operated at 60° C. The mobile phases were 0.1% TFA in water as mobile phase A, 0.1% TFA in acetonitrile as mobile phase B, and the flow rate was set to 0.2 mL/min. The UV traces were recorded at 215 and 280 nm. The separation was achieved over 55 min with an initial 0.5 min hold at 15% A, followed by an increase to 25% A over the next 0.5 min, and another linear increase to 40% A over the next 40 minutes. The gradient was then ramped to 100% A over 1 min and held for 2 minutes, before dropping to 15% A in 1 min, and then maintained at initial condition for over 10 minutes to equilibrate the column for the next run. The UPLC was directly coupled to a Thermo Scientific Q Exactive hybrid quadrupole Orbitrap mass spectrometer. The capillary voltage was set at 4.0 kV, with a sheath gas flow rate of 40 arbitrary units and auxiliary gas flow rate of 15 arbitrary units. The capillary temperature was set at 350° C. and the probe heater temperature was set at 400° C. Mass spectra were acquired in the mass range of m/z 800-4000. The raw data were deconvoluted using Intact Mass™ software developed by Protein Metrics.

Results

A recombinant IgG1 mAb (mAb-1) drug substance sample was used as a model molecule. After treatment with PNGase F to remove N-linked glycans on each heavy chain, the deglycosylated mAb-1 sample was separated on a HILIC column and analyzed by both photodiode array (PDA) detection (at both 280 nm and 215 nm) and mass spectrometry analysis (FIGS. 1A and 1B). As shown in the UV profile (FIG. A1, bottom trace), the overall level of LMW impurities in mAb-1 drug substance sample was very low, suggesting a successful purification process. By comparing the total ion chromatogram (TIC) generated from mass spectrometry analysis to the UV chromatogram, an additional peak (with a retention time at ~18.2 min) was observed in the TIC trace, which corresponded to the major glycan form (G0F) released from mAb-1 by PNGase F. As oligosaccharides do not exhibit UV absorption at either 280 nm or 215 nm, they are invisible in UV detection. In addition to the PNGase F reagent peak, all other minor peaks were identified as mAb-1 related LMW impurities, specifically, free light chain (w/multiple modifications), Fab fragments, half-antibody, Fab-truncated species and H2L species (FIGS. 1A and 1B). The elution order of these LMW impurities on the HILIC column was correlated with their relative size, with smaller fragments eluting earlier than the larger fragments. It is important to note that removing the N-linked glycans from the mAb molecule is essential before this analysis. Otherwise, the size-based elution order on the HILIC column will be complicated by the presence or absence of glycans and the different glycoforms.

Example 2: Free Light Chain

Results

Figure 2D:
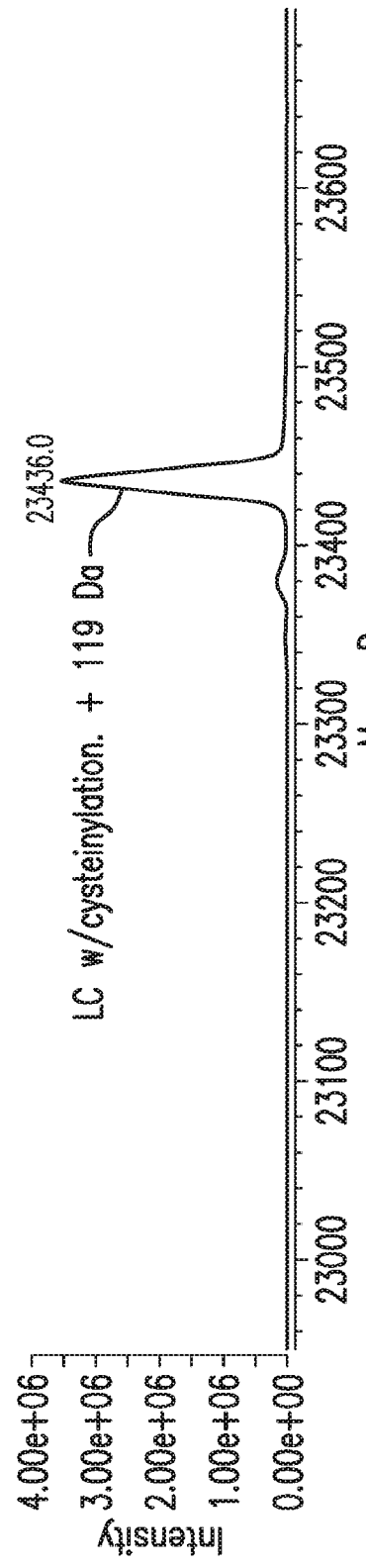
FIG. 2D shows the deconvoluted mass spectrum of light chain with cysteinylation.
Figure 2E:
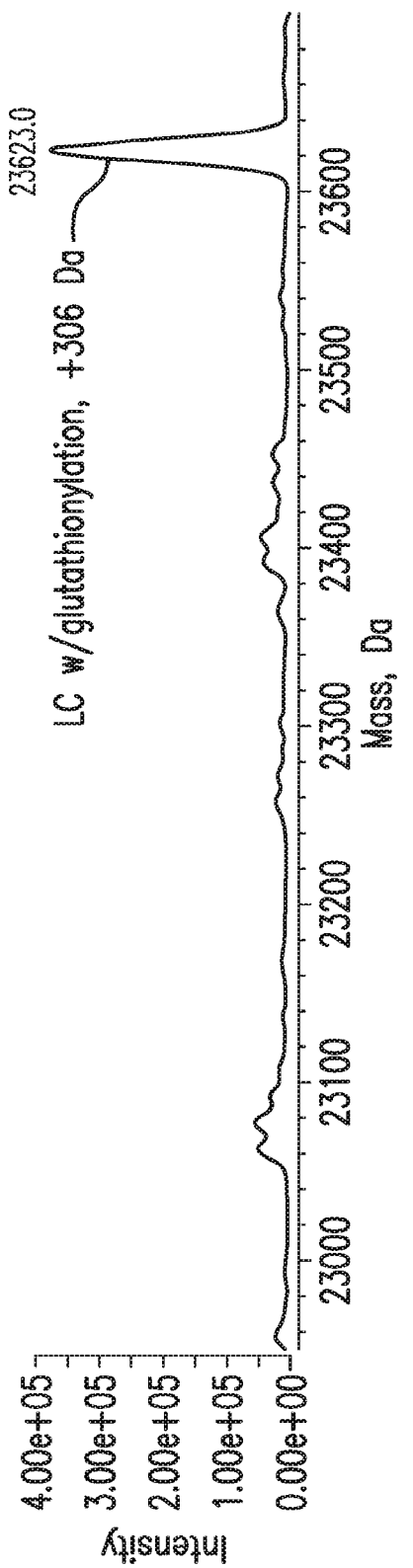
FIG. 2E shows the deconvoluted mass spectrum of light chain with glutathionylation.

Multiple light chain-related impurities were detected in HILIC-MS analysis of the mAb-1 sample (FIGS. 2A-2E). The extracted ion chromatograms (XICs) of each species suggested that they also exhibited different retention times during HILIC separation (FIG. 2A). Interestingly, the cysteinylated light chain (+~119 Da) was identified as the major form of all light chain species present in mAb-1 sample and it is the only species visible by UV (FIG. 2D). The cysteinylation may occur as a result of the thiol-disulfide exchange reaction between the inter-heavy and light chain disulfide bond and a free cysteine molecule, which can be found in cytoplasm. In addition, glutathionylated light chain (+~306 Da) was also identified, with a retention time slightly later than the cysteinylated light chain (FIG. 2E). Similar to the cysteinylation process, free glutathione (GSH) molecule, which can also be found in cytoplasm, should be responsible for this modification. Another interesting LC variant with a delta mass of +~90 Da from predicted mass was also observed (FIG. 2C). Subsequent peptide mapping analysis using recombinant Lys-C protease located this modification to light chain C-terminal Cys residue. Based on accurate delta mass (+89.98 Da) and isotopic distribution, it was speculated that this modification was as a result of the thiol-disulfide exchange reaction between the inter-heavy and light chain disulfide bond and a 2-mercaptoacetic acid molecule. However, how this compound was introduced or generated during mAb production is currently under investigation. Although invisible in the UV trace, unmodified free light chain can also be detected by more sensitive mass spectrometry analysis, along with a group of light chain variants corresponding to the sequential clipping of the C-terminal amino acid residues (FIG. 2C). The resulting amino acid ladder as shown in the deconvoluted mass spectrum (FIG. 2C) matched with the C-terminal sequence of light chain (Gly-Glu-Cys). The removal of C-terminal amino acid residues from the light chain might be attributed to the presence of some carboxyl peptidases in the cell culture (Dick L W, Jr., Qiu D, Mahon D, Adamo M, Cheng K C. *Biotechnology and bioengineering,* 100:1132-43 (2008); Hu Z, et al. *Biotechnology and bioengineering,* 113:2100-6 (2016). Finally, another light chain variant with a mass decrease of ~34 Da was also identified (FIG. 2B), suggesting possible cysteine to dehydroalanine conversion via β-elimination on the light chain C-terminal Cys residue. This reaction has been well studied previously and identified as a major pathway for subsequent truncation at the antibody hinge region during storage (Cohen S L, Price C, Vlasak J. *Journal of the American Chemical Society,* 129:6976-7 (2007)). It is noteworthy all those light chain related impurities are not likely to be detected by SEC method under native conditions, as they can still bind to the heavy chain via a strong non-covalent interaction despite the broken inter-heavy and light chain disulfide bond.

Example 3: Fab Fragment

Results

It is well known that the upper hinge region of heavy chains in an IgG1 molecule is susceptible to hydrolysis leading to the formation of two complementary LMW species, a Fab fragment and a Fab-truncated species (Cordoba A J, Shyong B J, Breen D, Harris R J. *Journal of chromatography B: Analytical technologies in the biomedical and life sciences,* 818:115-21 (2005). The HILIC-MS method detected both species in the mAb-1 sample. Four major Fab fragments with different masses were identified (FIGS. 3A-3D) and the truncation sites were located by comparing the measured masses with the predicted masses, based on the cDNA-derived amino acid sequence. The amino acid pattern indicated in the deconvoluted mass spectrum matched with the heavy chain hinge region sequence (Cys-Asp-Lys-Thr-His-Thr-Cys) (Sequence Listing No. 1). It is worth noting that any Fab fragment should have been readily removed during the purification process due to the lack of the Protein A binding site. Therefore, the presence of Fab fragments in the final drug product indicated that those impurities were introduced as degradation products during sample storage. The successful detection of those species emphasizes that the HILIC-MS method would be useful in stability and forced degradation studies during mAb drug development.

Example 4: Half Antibody

Results

Figure 3A:
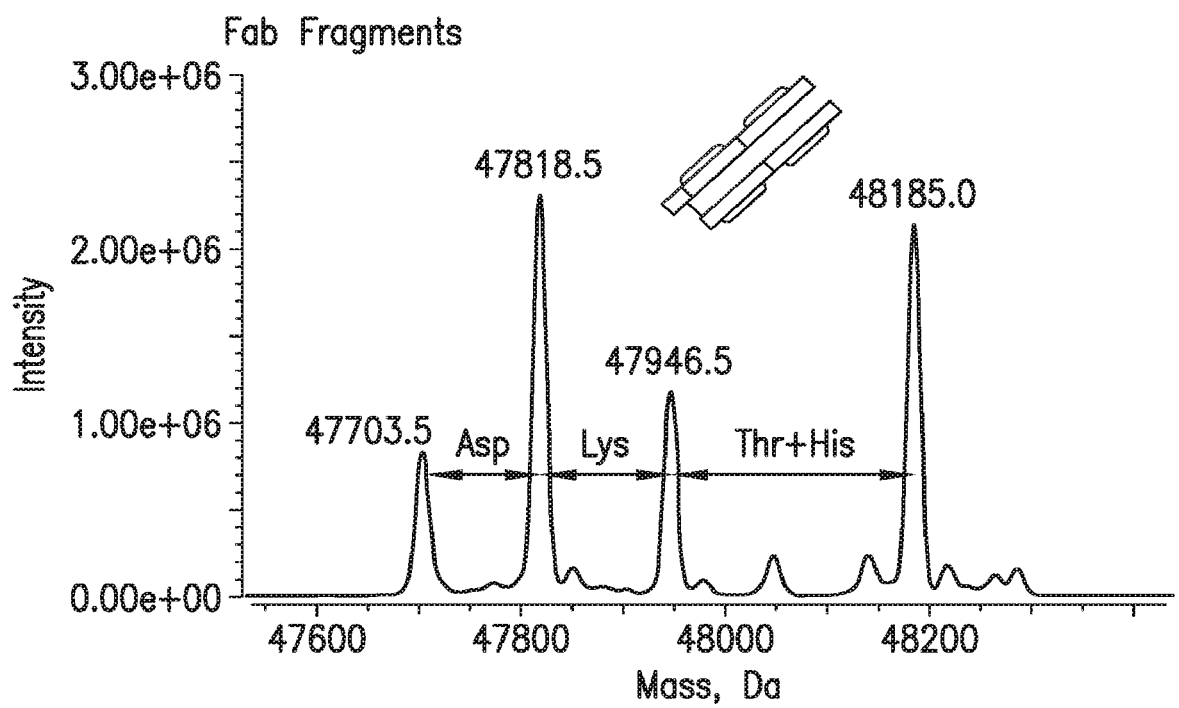
FIG. 3A shows the deconvoluted mass spectrum of Fab fragments.
Figure 3B:
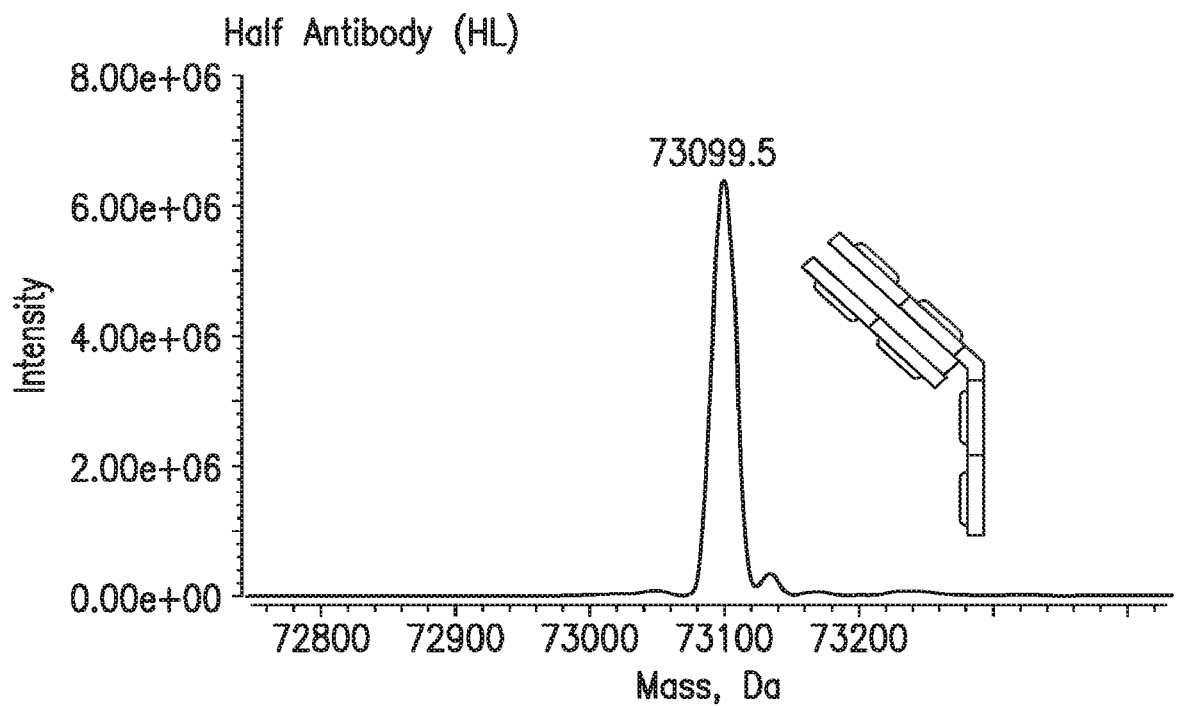
FIG. 3B shows the deconvoluted mass spectrum of half antibody.

Half antibody is formed as a result of inter-heavy and heavy chain disulfide bonds at the hinge region scrambling into intra-heavy chain disulfide bonds. Under native conditions, the four-chain structure of a mAb molecule remains undisrupted by this scrambling, owing to the strong non-covalent interaction between the two heavy chain C-terminal regions. However, when a method with denaturing conditions is used, such as SDS-PAGE or CE-SDS, the two half antibody molecules will dissociate from each other and appear as LMW impurities. During the HILIC-MS analysis of mAb-1 product, the half antibody molecule was confidently identified (FIG. 3B). The good agreement between the measured mass (73,099.5 Da) and the predicted mass (73,100.1 Da) suggested that, unlike extensively modified free light chain, no substantial modification was associated with the formation of the half antibody, consistent with the disulfide bond scrambling pathway.

Example 5: Fab Truncates Species

Results

Figure 3C:
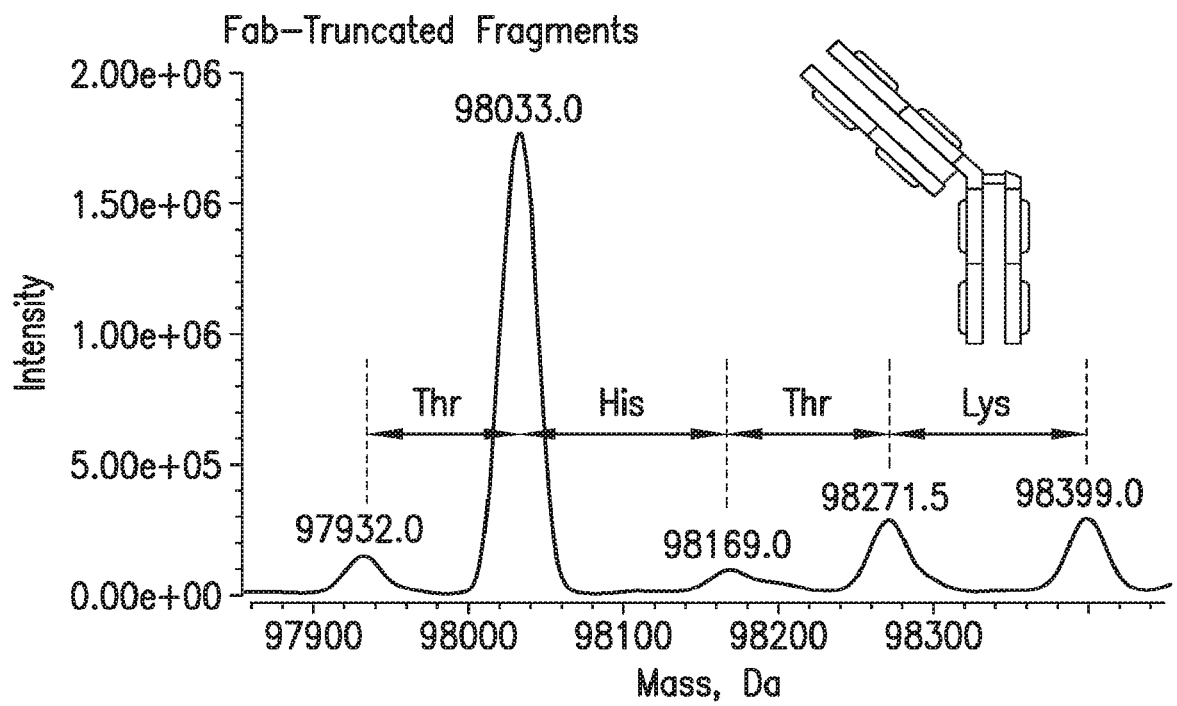
FIG. 3C shows the deconvoluted mass spectrum of Fab-truncated fragments.

As the complementary fragments to the Fab fragments after heavy chain hinge region truncation, Fab-truncated species were also identified in mAb-1 sample by the HILIC-MS method (FIG. 3C). On the HILIC column, those species were eluted right before the main peak as a partially resolved shouldering peak. The subsequent mass measurement confirmed the identity of the Fab-truncated species and truncation sites were located at the hinge region consistent with those observed in the Fab fragments. Despite the inferior resolution in separation compared to electrophoretic methods, the HILIC-MS method prevails in high fidelity and specificity by accurate mass measurement, making unambiguous identification possible. Unlike the Fab fragments, the Fab-truncated species are very difficult to remove from the main species during purification, due to the preserved Fc region that binds to Protein A. Monoclonal antibody molecules missing a Fab arm are expected to exhibit compromised potency as one of the two target binding sites is not present. For bispecific mAb molecules, losing one Fab arm is detrimental for drug activity, since both Fab arms are essential to achieve the designed therapeutic functions. Therefore, the ability to detect and identify those species directly in a drug substance sample is highly important because time and resources are not only saved, but also avoids the introduction of possible artifacts during the enrichment process.

Example 6: H2L Species

Results

Figure 3D:
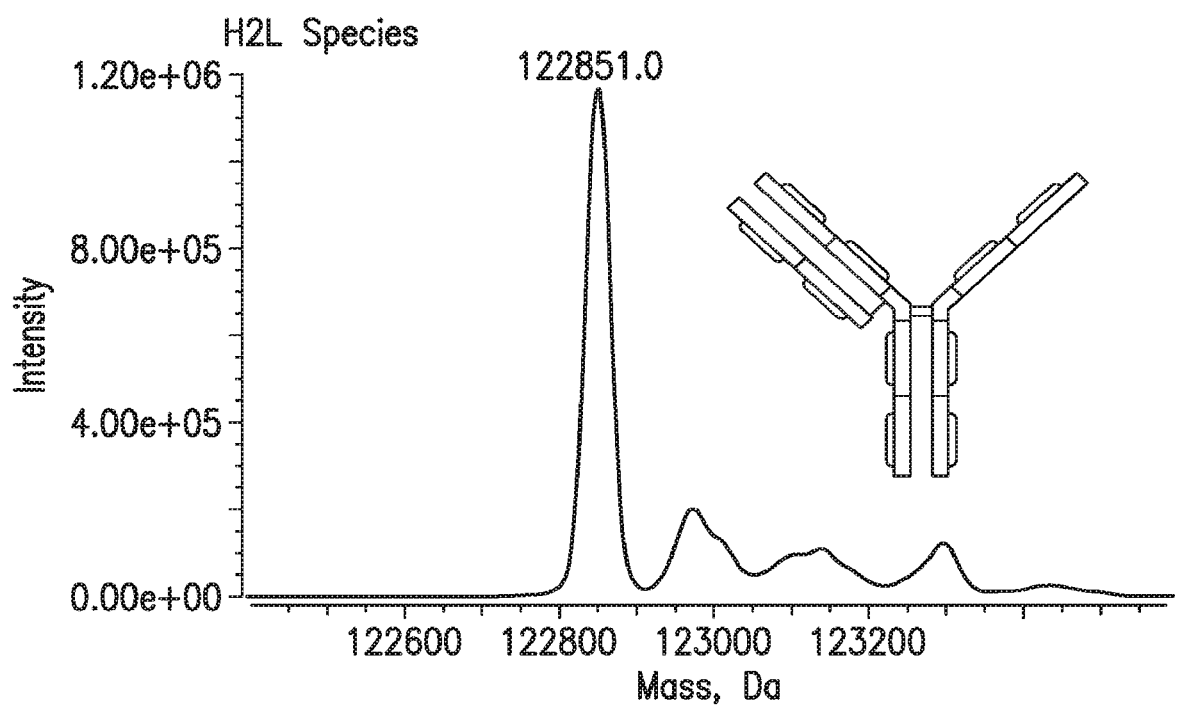
FIG. 3D shows the deconvoluted mass spectrum of H2.

The H2L species, comprised of two heavy chains and one light chain, are frequently observed as the most abundant LMW impurities by SDS-PAGE and CE-SDS methods, but their identification is usually only supported by indirect and insufficient evidence. For example, N-terminal sequencing analysis of the H2L-containing minor band on SDS-PAGE can reveal the first several amino acid residues of both heavy chain and light chain, and the signal intensity ratio between heavy chain and light chain might suggest a 2 to 1 ratio. In-gel digestion of the H2L-containing minor band followed by LC-MS based peptide mapping analysis can confidently confirm the presence of both heavy chain and light chain. However, it is difficult to establish an accurate ratio between heavy chain and light chain. Both methods provide partial identification of H2L species, but neither can reveal a complete structure. In contrast, HILIC-MS method offers direct identification of H2L species at the intact protein level. In mAb-1 product, a homogeneous H2L species was observed to co-elute with the Fab-truncated species slightly ahead of the intact antibody. The detected mass (122,851.0 Da) of the H2L species was approximately 34 Da smaller than the predicted molecular weight of a H2L molecule (122,884.5 Da). The β-elimination of a heavy chain cysteine residue, presumably the one originally forming the inter-heavy and light chain disulfide bond, was the root-cause of forming H2L species in mAb-1 sample. This level of confidence and detailed information cannot be achieved by other well-established purity assays, making this method very valuable in providing essential identification for those LMW impurities. It is believed that this study is the first case where H2L species is shown to be directly detected by intact mass analysis in a mAb drug substance sample without prior enrichment (FIG. 3D).

Figure 4:
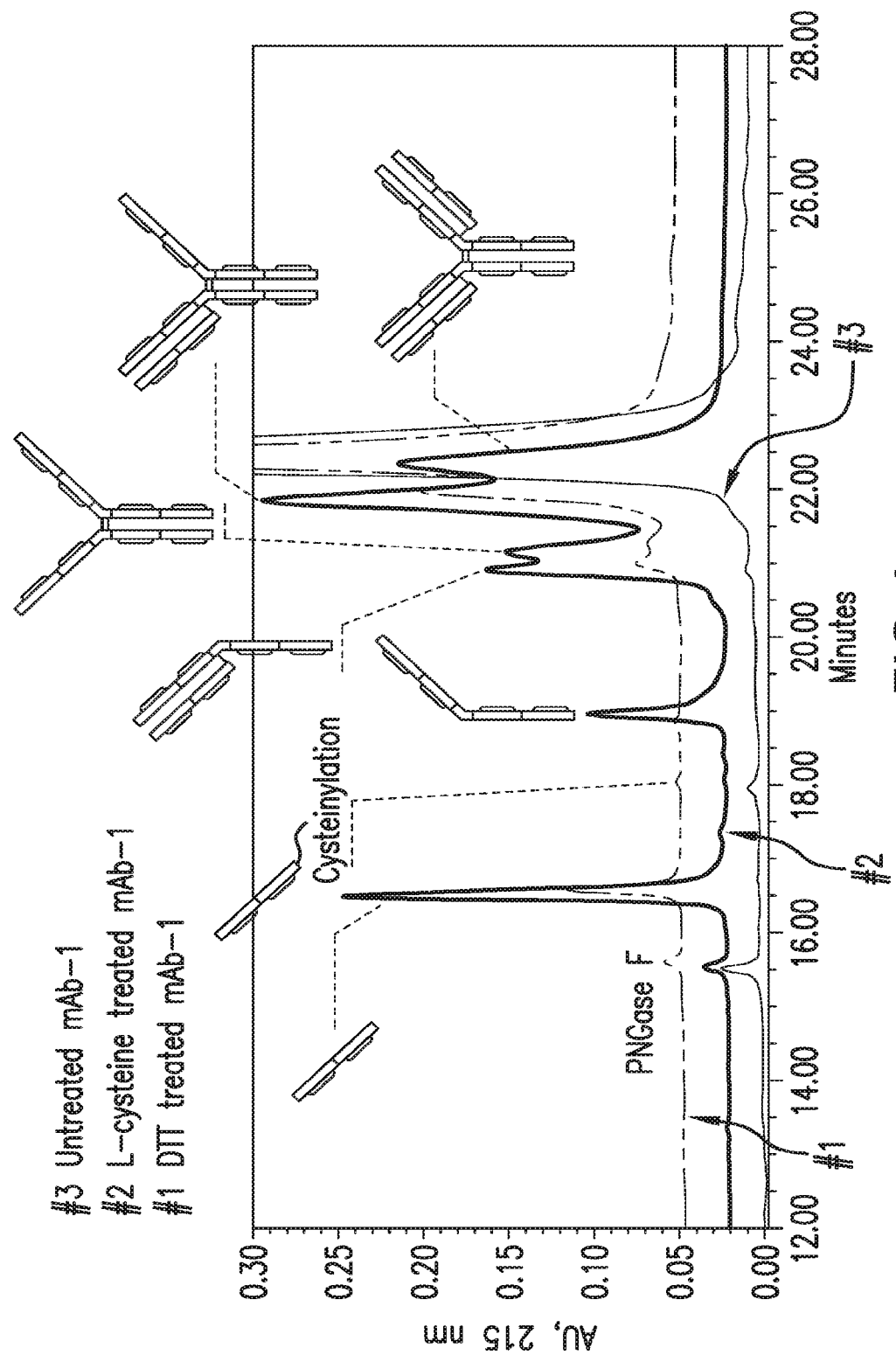
FIG. 4 shows The HILIC-UV analysis of deglycosylated mAb-1 sample treated by DTT (arrow #1) and L-cysteine (arrow #2). Arrow #3 points to the trace with untreated mAb-1. The signal of untreated sample and L-cysteine treated sample were amplified 10 times and 2 times, respectively, to better visualize the LMW impurities.
Figure 5A:
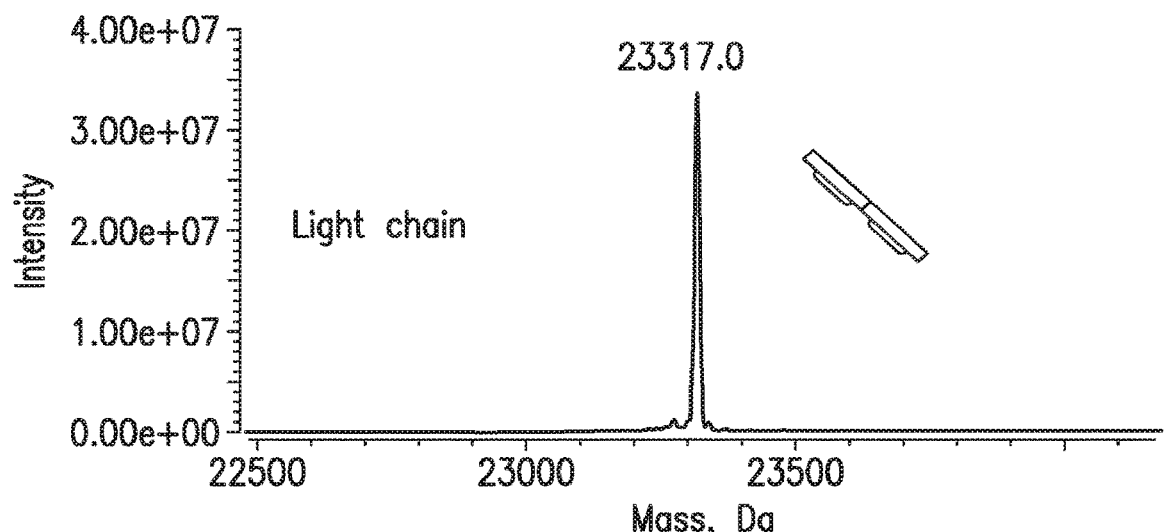
FIG. 5A shows light chain species identified in HILIC-MS analysis of mAb-1 after treated with DTT.
Figure 5B:
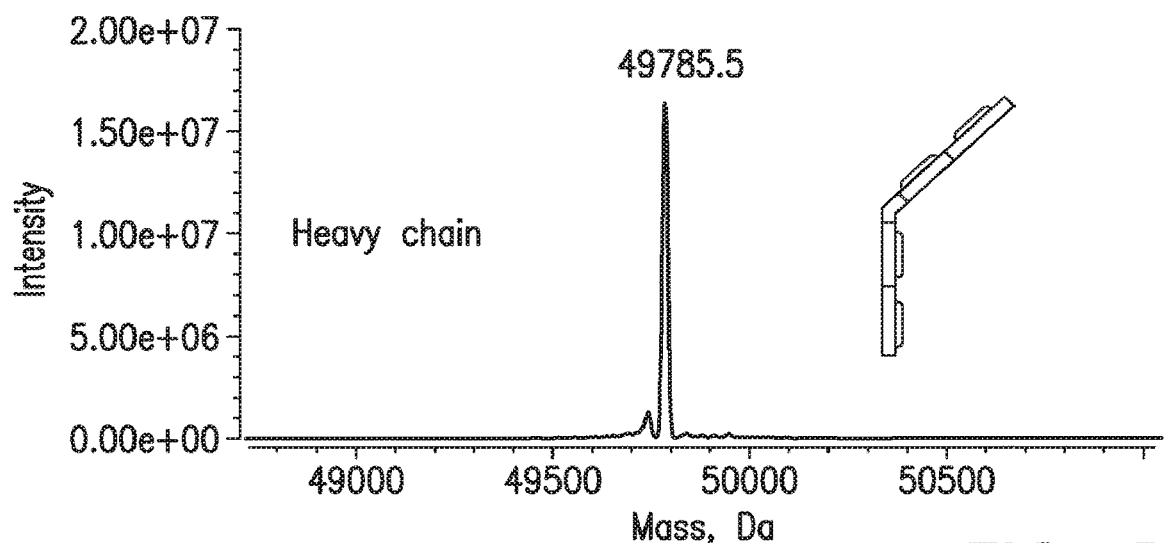
FIG. 5B shows heavy chain species identified in HILIC-MS analysis of mAb-1 after treated with DTT.
Figure 5C:
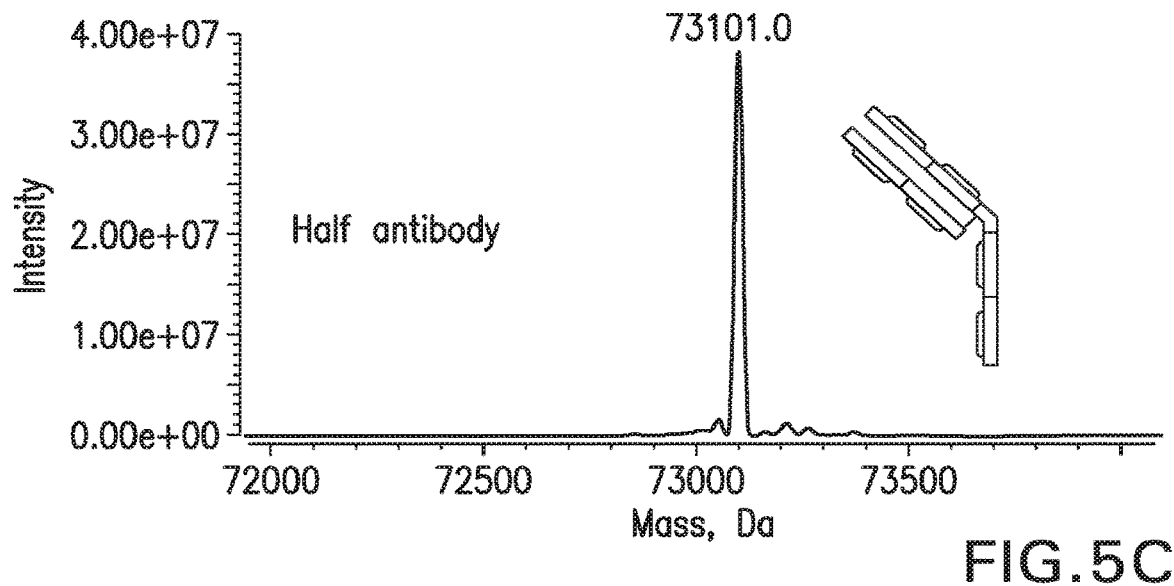
FIG. 5C shows half antibody species identified in HILIC-MS analysis of mAb-1 after treated with DTT.
Figure 5D:
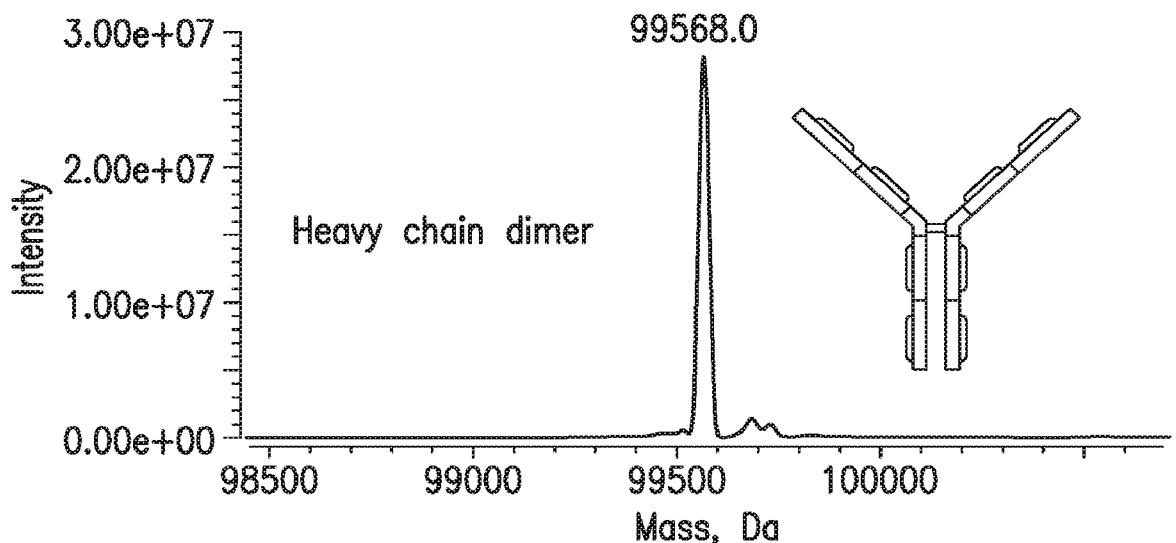
FIG. 5D shows heavy chain dimer species identified in HILIC-MS analysis of mAb-1 after treated with DTT.
Figure 5E:
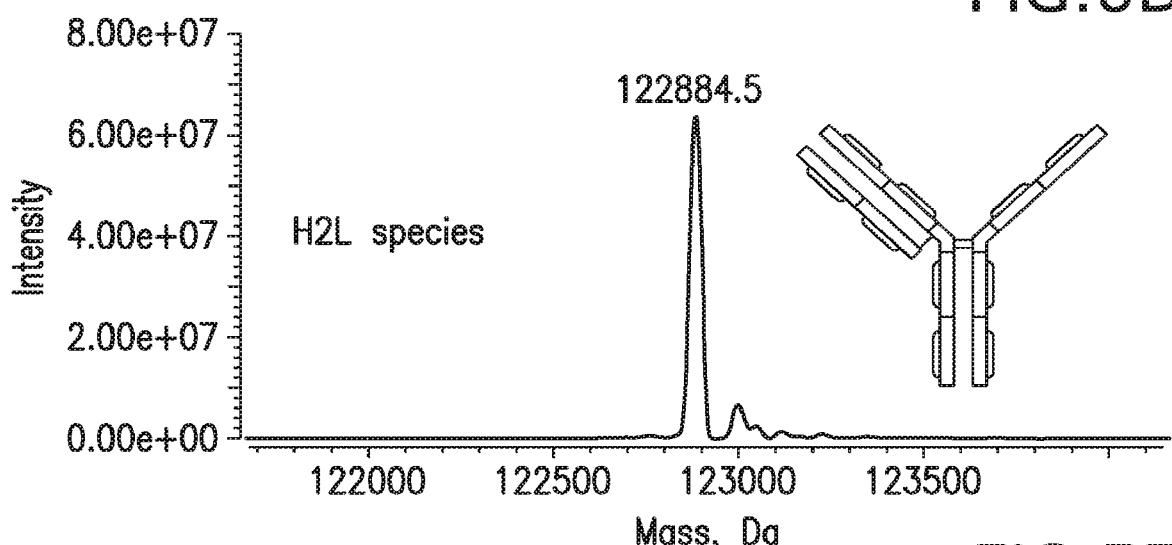
FIG. 5E shows H2L species identified in HILIC-MS analysis of mAb-1 after treated with DTT.
Figure 5F:
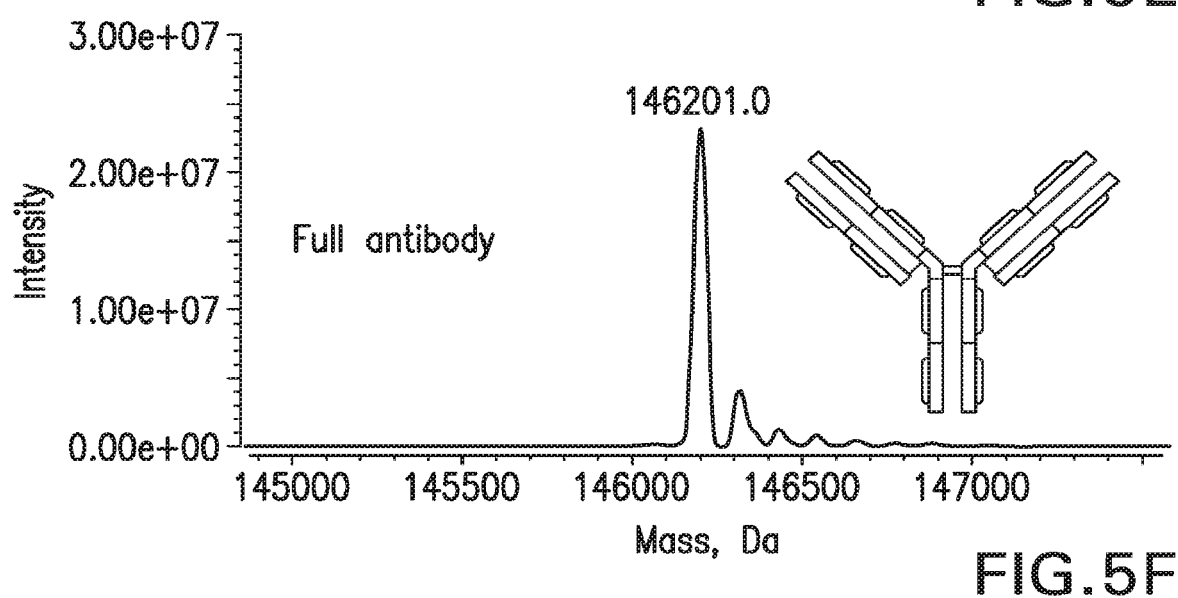
FIG. 5F shows full antibody species identified in HILIC-MS analysis of mAb-1 after treated with DTT.
Figure 7A:
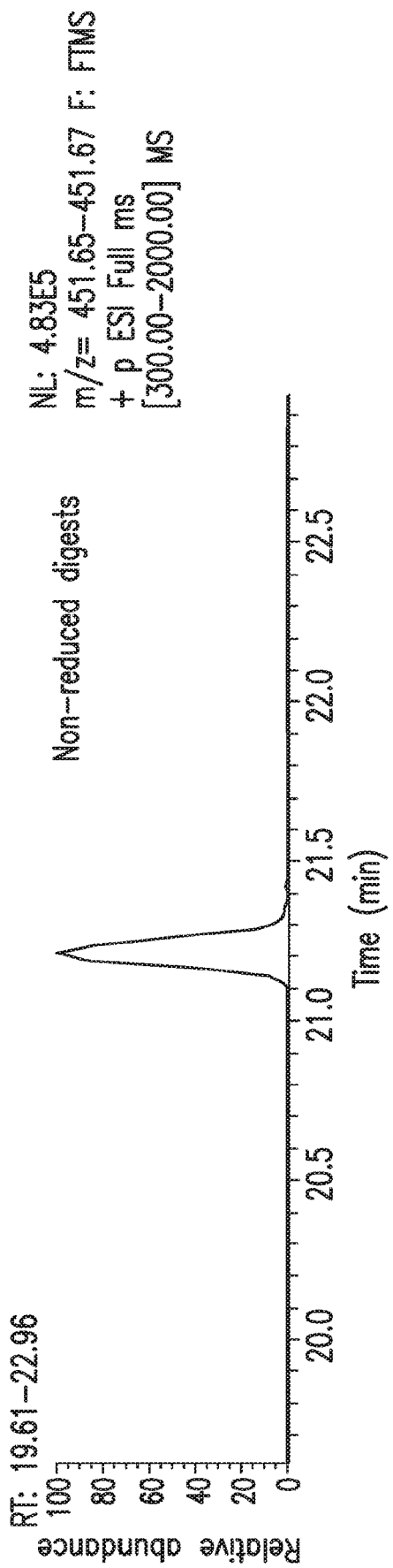
FIG. 7A shows the extracted ion chromatogram (XIC) of light chain C-terminal peptide with unknown modification of +89.98 Da non-reduced Lys-C digests.
Figure 7B:
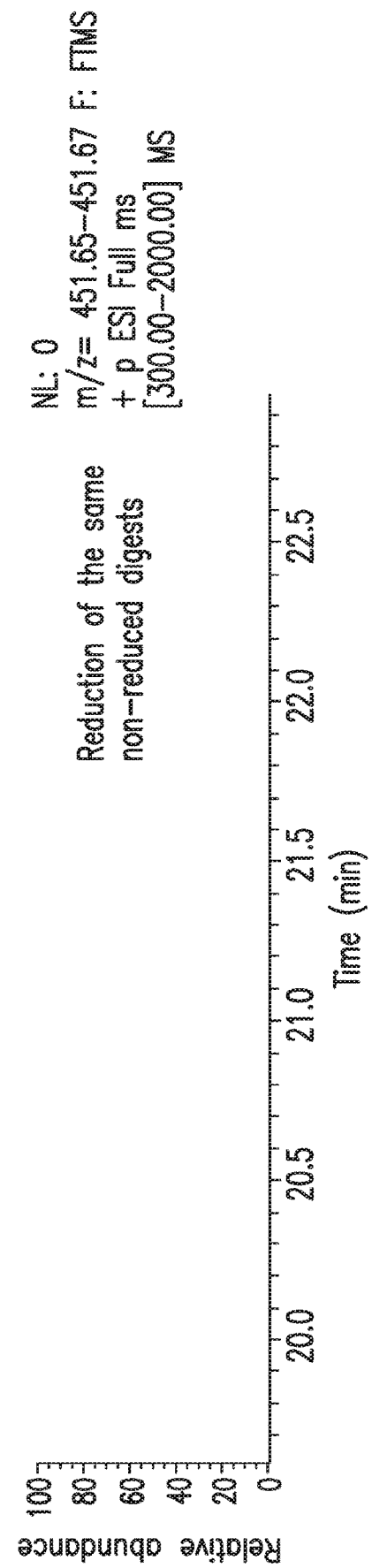
FIG. 7B shows the extracted ion chromatogram (XIC) of light chain C-terminal peptide with unknown modification of +89.98 Da from reduction of the non-reduced Lys-C digests.
Figure 8:
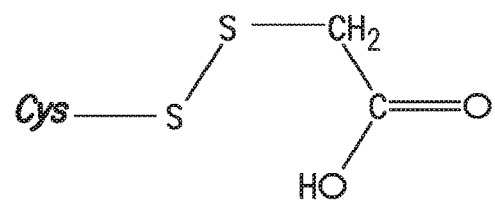
FIG. 8 is the proposed structure (2-mercaptoacetic acid) of the unknown modification.
Figure 9:
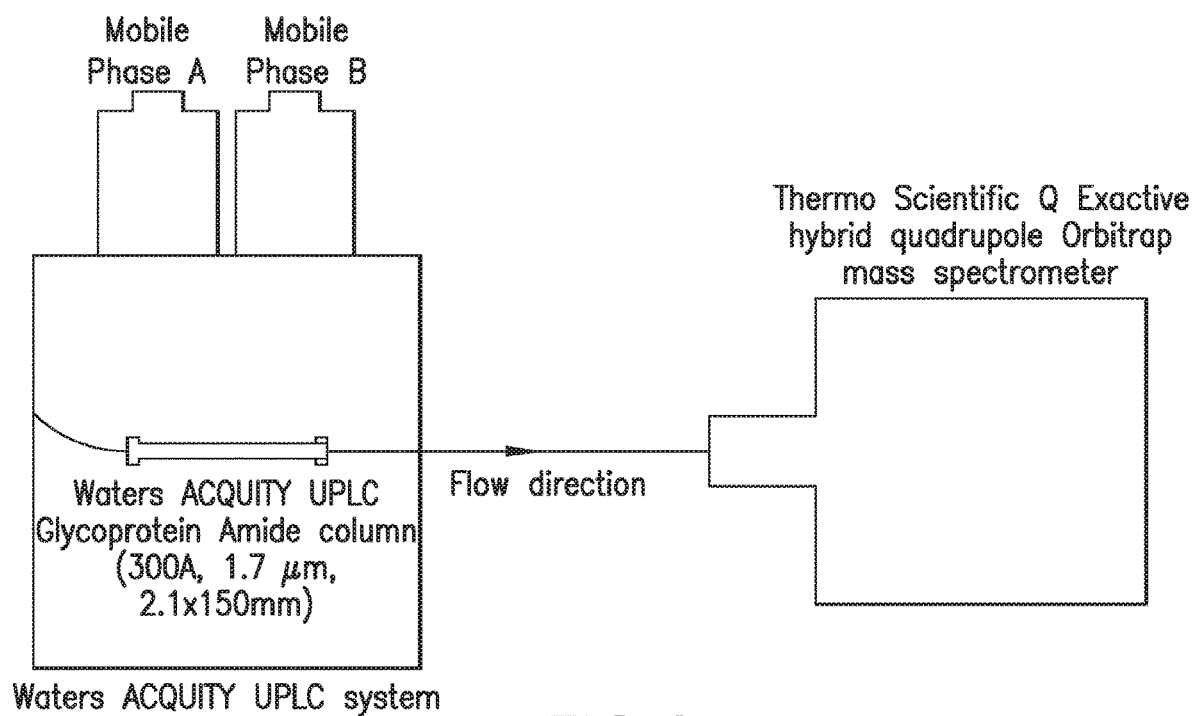
FIG. 9 is an exemplary HILIC-MS system.

Example 7: LMW Impurities Generated Under Forced Conditions by Limited Reduction Results Comparing to the HILIC-MS analysis of the mAb-1 sample, SDS-PAGE and CE-SDS methods frequently identified more LMW impurities, including the heavy chain dimer and free heavy chain. In order to demonstrate the capability of the new HILIC method in detecting those impurities, the deglycosylated mAb-1 sample was further treated with reductant (dithiothreitol (DTT) and L-cysteine) under native conditions to facilitate the formation of various LMW impurities. It has been reported that under native conditions, only inter-chain disulfide bonds in a mAb molecule can be reduced by DTT, since they are the only solvent-accessible disulfide bonds in the molecule (Liu H, et al. Analytical chemistry, 82:5219-26 (2010)). After briefly exposing mAb-1 molecule to DTT or L-cysteine, LMW impurities with different heavy chain and light chain combinations can be generated, including free light chain, free heavy chain, half antibody, heavy chain dimer and H2L species. As shown in FIG. 4, these predicted LMW species were detected in the HILIC separation with the elution order consistent with their relative size. In addition to those observed in the untreated mAb-1 sample, two more LMW species, specifically, the free heavy chain species and the heavy chain dimer species, were observed to elute between the free light chain and half antibody, and slightly after the half antibody (partially resolved peak), respectively.

In addition to elution order-guided assignment, the subsequent mass spectrometry analysis following HILIC separation further confirmed the identity of each impurity based on accurate mass (FIGS. 5A-5F). Interestingly, the light chain species in the DTT-treated mAb-1 sample exhibited a very different retention time than the light chain species observed in the untreated sample (FIG. 4). Based on the accurate mass measurement, the difference in retention time was attributed to the cysteinylation on light chain that was present in the untreated sample but absent in the DTT-treated sample. Consistently, when mAb-1 was treated with L-cysteine, a small fraction of the light chain species was observed at the same retention time as the light chain species in the untreated sample, suggesting the occurrence of cysteinylated light chain in the L-cysteine-treated sample. Finally, the measured mass of H2L species in DTT-treated sample (122,884.5 Da) was in agreement with the predicted mass of the unmodified H2L species (122,884.5 Da) because it is predominantly composed of the H2L species generated via disulfide bond reduction (predicted mass: 122,884.5 Da) and low levels of pre-existing H2L species generated via β-elimination (predicted mass: 122,850.4 Da)

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All publications mentioned throughout this disclosure are incorporated herein by reference in their entirety.

All references cited herein are incorporated by reference in their entirety. The present invention may be embodied in other specific forms without departing from the spirit or essential attributes thereof and, accordingly, reference should be made to the appended claims, rather than to the foregoing specification, as indicating the scope of the invention.

I claim:

1. A method for characterizing low molecular weight protein drug impurities in a protein drug product sample comprising:
    i) deglycosylating the protein drug product sample, wherein the protein drug product sample comprises a protein drug, low molecular weight protein drug impurities, and an excipient;
    ii) separating deglycosylated protein components of the deglycosylated protein drug product sample by hydrophilic interaction chromatography;
    iii) analyzing the separated deglycosylated protein components by mass spectroscopy to characterize the low molecular weight protein drug impurities in the protein drug product sample,
    wherein the protein drug product sample comprises between 0.05% and 30.0% (w/w) of low molecular weight protein drug impurities, and
    wherein the low molecular weight protein drug impurity is characterized as a low molecular weight protein drug impurity selected from the group consisting of free light chain, half antibody, H2L, H2, HL, HC, or a combination thereof.

2. The method of claim 1, wherein the protein drug product sample is from a fed-batch culture.

3. The method of claim 1, wherein the protein drug is selected from the group consisting of an antibody, a fusion protein, recombinant protein, or a combination thereof.

4. The method of claim 1, wherein the protein drug product sample comprises between 0.05% to 25% w/w of low molecular weight protein drug impurities.

5. The method of claim 1, wherein the protein drug product sample comprises between 0.05% to 15% w/w of low molecular weight protein drug impurities.

6. The method of claim 1, wherein the protein drug product sample comprises between 0.05% to 10% w/w of low molecular weight protein drug impurities.

7. The method of claim 1, wherein the protein drug product sample comprises between 0.05% to 5% w/w of low molecular weight protein drug impurities.

8. The method of claim 3, wherein the protein drug product is a recombinant IgG1 mAb antibody.

* * * * *